US012694656B2

(12) United States Patent
Cox

(10) Patent No.: US 12,694,656 B2
(45) Date of Patent: Jul. 28, 2026

(54) VEHICULAR SENSOR SYSTEM CALIBRATION

(71) Applicant: NETRADYNE, INC., San Diego, CA (US)

(72) Inventor: Jonathan Albert Cox, Imperial Beach, CA (US)

(73) Assignee: NETRADYNE, INC., San Diego, CA (US)

( * ) Notice: Subject to any disclaimer, the term of this patent is extended or adjusted under 35 U.S.C. 154(b) by 754 days.

(21) Appl. No.: 17/638,992

(22) PCT Filed: Sep. 4, 2020

(86) PCT No.: PCT/US2020/070498

§ 371 (c)(1),
(2) Date: Feb. 28, 2022

(87) PCT Pub. No.: WO2021/046578

PCT Pub. Date: Mar. 11, 2021

(65) Prior Publication Data

US 2022/0270358 A1 Aug. 25, 2022

Related U.S. Application Data

(60) Provisional application No. 62/896,511, filed on Sep. 5, 2019.

(51) Int. Cl.
G06T 7/80 (2017.01)
G01S 19/47 (2010.01)
(Continued)

(52) U.S. Cl.
CPC ............ G06V 10/811 (2022.01); G01S 19/47 (2013.01); G06T 7/70 (2017.01); G06T 7/80 (2017.01);
(Continued)

(58) Field of Classification Search
CPC .... G01S 19/47; G06V 10/764; G06V 10/811; G06V 20/56; G06V 20/58; G06V 20/582;
(Continued)

(56) References Cited

U.S. PATENT DOCUMENTS

2003/0078730 A1* 4/2003 Sekiguchi ............... G01S 11/12
340/436
2006/0103927 A1* 5/2006 Samukawa ........... G01S 17/931
359/436
(Continued)

FOREIGN PATENT DOCUMENTS

DE 102010044112 * 12/2011
DE 102010044112 A1 12/2011
(Continued)

OTHER PUBLICATIONS

International Search Report and Written Opinion in International Patent Application No. PCT/US20/70498 dated Jan. 21, 2021, 15 pages.
(Continued)

*Primary Examiner* — Jessica M Prince
(74) *Attorney, Agent, or Firm* — FOLEY & LARDNER LLP

(57) ABSTRACT

The present disclosure provides devices, systems and methods for a vehicular sensor system that detects and classifies objects, and further determining a vanishing point and aspect ratios, which enable detecting a misalignment of a lens focus and determining quality metrics; and calibrating the sensor system.

26 Claims, 15 Drawing Sheets

(51) Int. Cl.

| | |
|---|---|
| *G06T 7/70* | (2017.01) |
| *G06V 10/764* | (2022.01) |
| *G06V 10/80* | (2022.01) |
| *G06V 20/56* | (2022.01) |

(52) U.S. Cl.
CPC ............ *G06V 10/764* (2022.01); *G06V 20/56* (2022.01); *G06T 2207/30241* (2013.01); *G06T 2207/30244* (2013.01); *G06T 2207/30252* (2013.01)

(58) Field of Classification Search
CPC ................ G06V 20/584; G06V 20/588; G06T 2207/10016; G06T 2207/20076; G06T 2207/30241; G06T 2207/30244; G06T 2207/30252; G06T 7/70; G06T 7/73; G06T 7/80
See application file for complete search history.

(56) References Cited

U.S. PATENT DOCUMENTS

| | | | | |
|---|---|---|---|---|
| 2010/0054538 | A1* | 3/2010 | Boon | ...................... G06T 7/246 |
| | | | | 382/104 |
| 2010/0253540 | A1 | 10/2010 | Seder et al. | |
| 2014/0118536 | A1* | 5/2014 | Morin | ................ H04N 1/32117 |
| | | | | 348/135 |
| 2014/0172290 | A1* | 6/2014 | Prokhorov | ............. G01C 21/28 |
| | | | | 701/408 |
| 2015/0222859 | A1* | 8/2015 | Schweid | ................ G06V 20/52 |
| | | | | 348/148 |
| 2017/0120814 | A1* | 5/2017 | Kentley | ................. B60Q 5/008 |
| 2017/0123428 | A1* | 5/2017 | Levinson | ........... B60W 60/0011 |
| 2017/0124781 | A1* | 5/2017 | Douillard | ............... G08G 1/207 |
| 2018/0324415 | A1 | 11/2018 | Bovyrin et al. | |
| 2019/0033867 | A1 | 1/2019 | Sharma | |
| 2019/0186920 | A1* | 6/2019 | Leach | ..................... G05D 1/027 |
| 2019/0188499 | A1* | 6/2019 | Hummelshøj | ........ G05D 1/0088 |
| 2019/0271550 | A1* | 9/2019 | Breed | ................ G01C 21/3848 |
| 2019/0272389 | A1* | 9/2019 | Viente | ................. G06F 21/6254 |
| 2019/0339393 | A1* | 11/2019 | Lingg | ..................... G01S 17/42 |
| 2020/0192872 | A1* | 6/2020 | Quinn | .............. G06F 16/24568 |
| 2020/0334861 | A1* | 10/2020 | Jin | ............................ G06T 7/80 |

FOREIGN PATENT DOCUMENTS

| | | |
|---|---|---|
| EP | 3416367 A1 | 12/2018 |
| WO | 2018104563 A2 | 6/2018 |

OTHER PUBLICATIONS

Extended European Search Report in EP Patent Application No. 20860714.3 dated Sep. 30, 2022 (11 pages).
Burnett, et al., "Building a Winning Self-Driving Car in Six Months," 2019 International Conference on Robotics and Automation (ICRA), May 20-24, 2019, pp. 9583-9589.
Communication pursuant to Article 94(3) EPC in EP Patent Application No. 20860714.3 dated Jul. 17, 2025, 6 pages.

* cited by examiner $$p(x_t \mid x_{t-1}, u_t)$$

$$p(z_t \mid x_t)$$

VEHICULAR SENSOR SYSTEM CALIBRATION

CROSS-REFERENCE TO RELATED APPLICATION

This application is a U.S. National Phase Application under 35 U.S.C. § 371 of International Application No. PCT/US20/70498, filed on Sep. 4, 2020, which claims the benefit of and priority to U.S. Provisional Application No. 62/896,511, filed on Sep. 5, 2019, and titled, "VEHICULAR SENSOR SYSTEM CALIBRATION," the entire contents of which are hereby incorporated by reference in its their entireties.

BACKGROUND

Field

Certain aspects of the present disclosure generally relate to visual perceptual systems, intelligent driving monitoring systems (IDMS), advanced driver assistance systems (ADAS), autonomous driving systems, and more particularly to systems and methods for automatic calibration of vehicular sensor systems.

Background

Vehicular sensor calibration may include determination of translational and angular offsets of sensors with respect to each other and/or with respect to a vehicle body and may further include determination of parameters that characterize properties of individual sensors. For example, vehicular sensor calibration may include a determination of a distance and direction between a vehicle-mounted positioning sensor, such as a Global Navigation Satellite System (GNSS) antenna, which may be mounted on a vehicle roof, and a vehicle-mounted camera, which may be mounted on a vehicle windshield.

Reliable calibration of vehicular sensor systems may benefit a number of driving related systems and devices, including IDMS, ADAS, and autonomous systems. Vehicular sensor system calibration may facilitate, for example, the creation and updating of map data. Map data, in conjunction with a calibrated vehicular sensor system, may improve localization accuracy of the vehicular body with respect to a mapped environment, which may in turn improve a number of vehicular functions. As vehicular mapping and localization becomes more accurate and reliable, IDMS, ADAS, autonomous driving systems, and the like, will also become more accurate and reliable.

Current methods of vehicular sensor system calibration may require burdensome and time-consuming measurement, tuning, and repositioning of sensors. Alternatively, or in addition, current calibration systems and methods may incorporate assumptions relating to narrow ranges of sensor system positions that might be expected from a sensor system that is installed during the original manufacturing of a vehicle. Furthermore, current vehicular sensor calibration precision may degrade over time as a result of normal wear from vehicular operation.

Accordingly, aspects of the present disclosure are directed to improved systems and methods for vehicular sensor system calibration that may overcome some of the challenges associated with current vehicular sensor system calibration systems and methods. Certain aspects of the present disclosure may enable automatic vehicular sensor system calibration for one or more vehicle sensors that may be installed "after-market", that is, subsequent to the original manufacturing of the vehicle. Furthermore, certain aspects of the present disclosure may enable vehicular sensor system calibration for vehicle-mounted sensors that may account for repositioning of certain sensors.

SUMMARY OF THE INVENTION

The present disclosure provides systems and methods for vehicular sensor system calibration. Certain mapping systems and methods improve upon the prior art by enabling vehicular sensor calibration while the vehicle is driven in typical driving environments.

Certain aspects of the present disclosure provide a system. The system comprises a memory and a processor coupled to the memory, wherein the processor is configured to automatically calibrate a vehicular sensor system.

Certain aspects of the present disclosure provide a method. The method generally comprises receiving data at a camera attached to a vehicle; detecting objects in sequentially captured frames; recognizing each object as belonging to a class that tends to be stationary or non-stationary; comparing stationary object tracks to predefined criteria; filtering object tracks based on quality; and jointly computing camera calibration parameters and object locations based on the filtered object tracks.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented, or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

It must be noted that as used herein and in the appended claims, the singular forms "a", "an", and "the" include plural referents unless the context clearly dictates otherwise. Thus, for example, reference to "an object" includes a plurality of objects.

Coordinate Frame Having an Origin at a Camera Sensor

Figure 1:
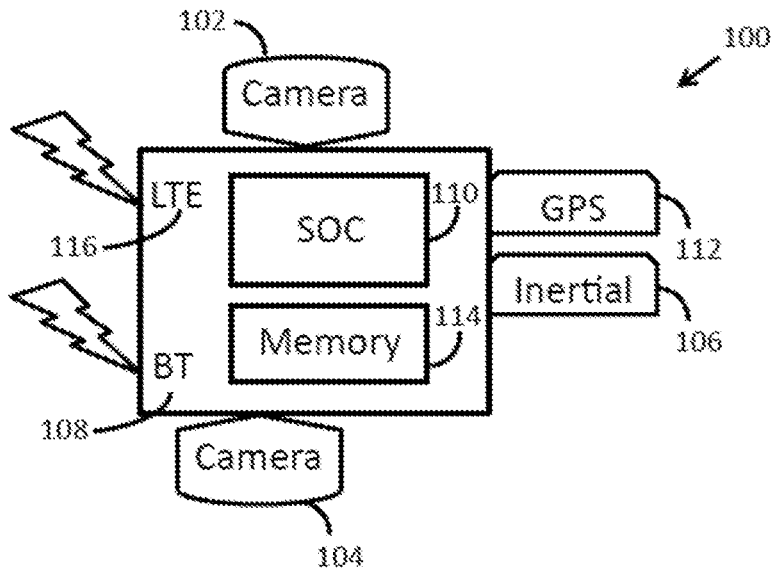
FIG. 1 illustrates an example of a device configured to calibrate a vehicular sensor system in accordance with certain aspects of the present disclosure.

An example of a device that contains a processor configured to perform vehicular sensor calibration in accordance with certain aspects of the present disclosure is illustrated in FIG. 1. The device may include a CPU, a GPU and/or specialized deep learning processor (which may be integrated into a System-on-a-Chip (SOC) 110), memory storage 114, four cameras (two cameras 102 and 104) are shown, communication channels (which may include Bluetooth (BT) 108 and Long-Term Evolution (LTE) 116 communication channels), and relative vehicle positioning sensors such as integrated inertial sensors 106. The system may be further configured to access wheel odometry via a wired or wireless connection directly to the sensor path of via a CAN Bus. The system may also include an world-referenced (which may be referred to as "absolute") vehicle positioning sensor such as a Global Positioning System (GPS) 112 or other GNSS, which may include an antenna that is integrated into a motherboard that also contains the SOC 110, or that may be placed at another location on the vehicle, such as on the roof.

Figure 2:
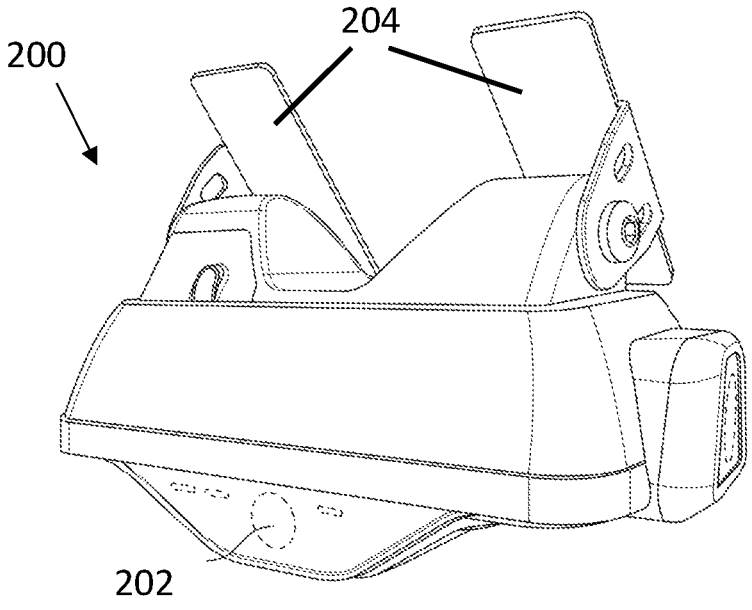
FIG. 2 illustrates an example of a device configured to calibrate a vehicular sensor system in accordance with certain aspects of the present disclosure.

The device 100 may be integrated into a device body 200 as illustrated in FIG. 2. The device 200 may be referred to as a Driveri™. The device body 200 may include one or more camera apertures, such as a driver-facing camera aperture 202. The system may be considered a vision-based Internet-of-Things (IoT) driving monitoring system, intelligent dashcam system, and the like. The device body may include mounting brackets 204 which may facilitate mounting of the device to a windshield of a vehicle.

Figure 3:
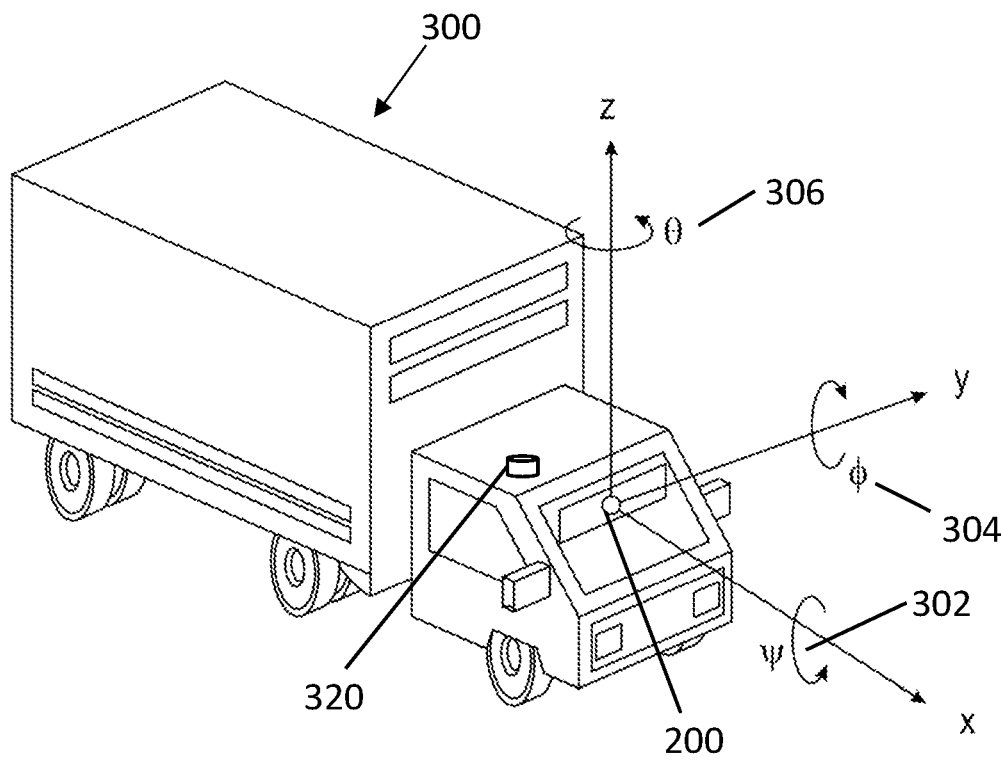
FIG. 3 illustrates an example of a vehicular sensor system in accordance with certain aspects of the present disclosure.

As illustrated in FIG. 3, the device body 200, may be mounted in a vehicle 300. In addition, a GPS antenna 320 may be mounted to the exterior of the roof the vehicle. In some embodiments, the GPS antenna may be coupled to the device body via a wired connection or a wireless connection. As illustrated, the device body 200 is mounted on the interior portion of the windshield. A coordinate system may be defined with respect to the straight-ahead direction of the vehicle and may be centered at a forward-facing camera on the device 200, so that the origin of each of the three dimensions of the coordinate system may be at a point corresponding to the forward-facing camera sensor. In this illustration, the x-direction corresponds to the straight-ahead direction of the vehicle, which may be the direction that the vehicle would travel if the steering angle is zero degrees. The y-direction corresponds to left/right directions. The z-direction corresponds to the up/down directions. In this coordinate system, the height of the camera, when mounted on the windshield, may correspond to a distance in the z-direction from the origin (location of the camera sensor) to the ground.

FIG. 3 further illustrates three angles which may describe the orientation of the device 200 when mounted in a vehicle 300. A roll angle 302 describes a rotation about the x-direction. A pitch angle 304 describes a rotation about the y-direction. A yaw angle 306 describes a rotation about the z-direction. An angle of 0 in all three angles may correspond to a device that is mounted in the windshield so that the camera view is level and facing directly forward in the straight-ahead direction of the vehicle.

Due to curvature of the windshield, small errors during installation, misalignments between the device body and the camera sensors, and the like, an installed device 200 may have non-zero rotations in one or more of these angles.

In some embodiments, a GNSS sensor 320 may be mounted on the vehicle 300 at a location that is different from the device body 200 that contains a forward-facing camera. For example, a GNSS sensor 320 may be mounted to the exterior of the roof of a truck cab. According to certain aspects of the present disclosure, the spatial offsets between the device body 200 and the GNSS sensor 320 may be determined using the same coordinate system as just described. The GNSS sensor illustrated in FIG. 3 may have a negative offset in the x-direction, indicating that the GNSS sensor is behind the device body 200. It may also have a negative offset in the y-direction, indicating that the GNSS sensor 320 is mounted to the right (passenger) side of the device body 200. Finally, it may have a positive offset in the z-direction, indicating that the GNSS sensor 320 is mounted at a position that is higher than the height of the device body. Other positional offsets are also contemplated.

Coordinate Frame Having an Origin at a Positioning Sensor

As described with reference to FIG. 3, a vehicle sensor system may use a position corresponding to a windshield-mounted camera sensor as the origin of a vehicle body reference frame. This choice of origin may be convenient for systems having a GNSS sensor rigidly attached to a camera system.

An alternative coordinate system for a vehicle body reference frame may be based on the center of mass of the vehicle. In this example, a first dimension of the vehicle body frame may point in the direction of the center of the earth when the vehicle is at rest on a flat stretch of road. A second dimension may point in the driving direction of the vehicle when the wheel turning angle is zero degrees. A third dimension may point in a lateral direction that is perpendicular to the first and second dimensions. This coordinate system may simplify computations associated with inertial sensor processing since the gravity vector may be expected to point in the direction of first dimension.

In the following description, the center of the vehicle body reference frame will be considered to be a point corresponding to the center of a positioning sensor, such as the GNSS sensor 320 illustrated in FIG. 3. By this convention, the height of the positioning sensor may be defined as the distance between the origin and the road when the vehicle is at rest on a flat driving surface. The forward/backward location of the positioning sensor and the right/left (lateral) location of the positioning sensor will then be zero.

Calibration parameters of a vehicle-mounted environmental sensor, such as a camera sensor, may include a determined height of the camera. The height of the camera may be specified as a vertical offset between the forward-facing camera of the device body 200 and the GNSS sensor 320. Calibration parameters of the camera sensor may further include a determined pitch 306, roll 302, and/or yaw 304 as illustrated in FIG. 3. These three angles and the three spatial offsets relative to the positioning sensor may be collectively be referred to as extrinsic parameters of the camera.

Calibration of the vehicle-mounted camera may further include characterization of one or more intrinsic parameters of the vehicle-mounted camera. Intrinsic camera sensor parameters may include a characterization of any misalignment between the focus point of a camera lens and the center of the camera's light sensor, asymmetries in the camera lens, a lens focal length, and the like.

Certain aspects of the present disclosure may be applied to vehicle sensor systems having environmental sensors that are not cameras, such as LiDAR or radar. A vehicle sensor system may comprise alternative, redundant, or partially redundant environmental and/or positioning sensors. In one example, a positioning sensor may be an integrated GPS-INS module, which may receive periodic Global Positioning signals and combine these with Inertial Sensor (INS) data streams to provide a first estimate of a position of the vehicle. In a second example, a positioning sensor may include a magnetometer, which may provide a heading estimate. In a third example, a positioning sensor may include a barometer, which may provide an elevation estimate. A positioning sensor that includes an inertial sensor such as a gyrometer or accelerometer may be referred to as an Inertial Measurement Unit (IMU). These examples just described may provide an earth-based ('absolute') position estimate, a relative position estimate, or may combine absolute and relative position estimates.

A vehicular sensor system may further include a variety of environmental sensors, such as a camera, LiDAR, and/or radar sensor. An environmental sensor may record signals that are indicative of objects, textures, or features in the vehicle's the surrounding environment of the vehicle. For example, a camera sensor may record signals that are indicative of the visual appearance, direction, and angular span of traffic sign, such as a stop sign, that is in front of the vehicle. A LiDAR or radar may record signals that are indicative of return times associated with one or more angular paths emanating from a corresponding transmitter.

In the above discussion, a vision sensor may be considered an environmental sensor. Other examples of environmental sensors include LiDAR, radar, and rgb-d. Examples of positioning sensors include IMU, IMU+Wheel Odometer+GPS. In some embodiments, a vision sensor may contribute to a position sensor. For example, visual odometry techniques may be used, sometimes in the absence of a map, to estimate and update the relative position of the camera sensor. As with filtering visual tracks for cleaner vehicular sensor calibration, filtering of visual tracks based on object recognition (to determine if the object is a kind that tends to be stationary) may improve the use of vision as a position sensor.

Joint Reduction of Uncertainty of Object Locations and Calibration Parameters

Systems and methods that calibrate a vehicle sensor system may comprise a determination of one or more offsets and angles of a vehicle-mounted camera with respect to a vehicle body reference frame. A vehicle body reference frame may be centered inside of the vehicle, at a location on the vehicle, or at any convenient point with respect to the vehicle.

Certain methods disclosed herein may determine translational offsets and rotational alignment angles between a positioning sensor and one or more environmental sensors. Alternatively, or in addition, certain methods disclosed herein may determine translational offsets and rotational alignment angles between a positional sensor and a vehicle body frame and between an environmental sensor and a vehicle body frame. In this second example, the relative offset and rotation between a positional sensor and an environmental sensor may be inferred by combining determined offsets between each sensor and the common vehicle body frame.

For mapping, a goal may be to reduce the uncertainty of where the object is located in a map. For localization, the goal may be to determine the 6-degree-of-freedom (6 DOF) position of the camera. As described with respect to FIG. 3, the six degrees of freedom may be the three spatial offsets of the camera from the positional sensor plus the three angular offsets of pitch, roll, and yaw.

Figure 4:
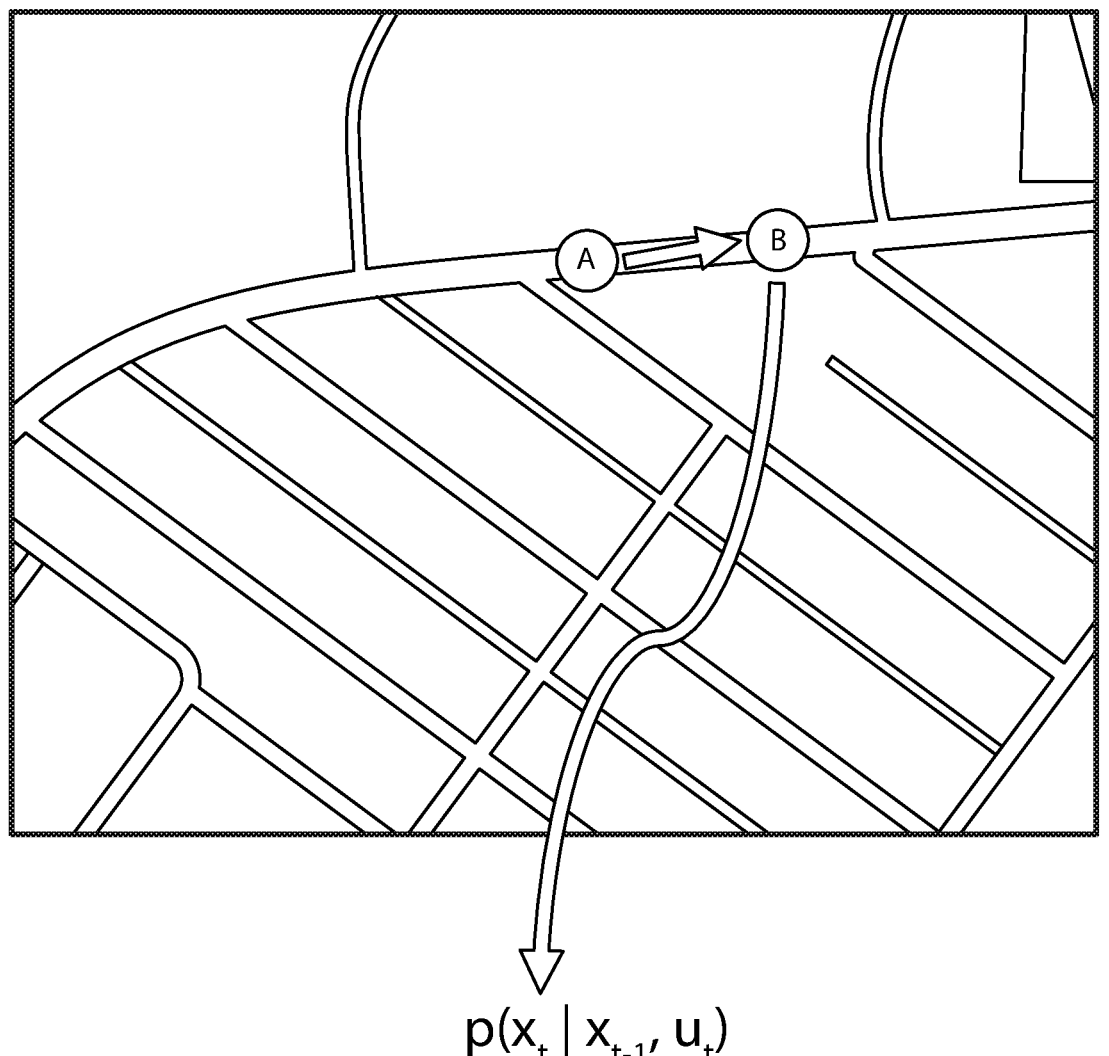
FIG. 4 illustrates an example of vehicular sensor system calibration in accordance with certain aspects of the present disclosure.

The offsets between an IMU and a camera sensor may be initially uncalibrated or may be approximately calibrated, for example, using parameters associated with common mounting positions of a camera and a vehicle positioning sensor within a vehicular sensor system. In another example, a camera image sensor and a positioning sensor may be integrated within a single device housing such that an initial estimate of calibration parameters may correspond to a known manufacturing layout. In some applications of certain aspects of the present disclosure, the IMU readings may nonetheless be used to position the camera in 6 DOF with a first estimate. For example, the IMU readings may be incorporated in a Motion Model, as illustrated in FIG. 4.

As the driver of the vehicle to which the camera and IMU system are mounted drives past an object, the system may repeatedly detect and map the object using estimated calibration parameters, approximately calibrated initial calibration parameters, and the like. That is, the system may acquire information about the position of the object given where it was detected within the camera image and where the camera was estimated to be at various times that the vehicle drove past the object. In one example, the object being mapped may be a street sign in the vicinity of the vehicle owner's home.

The uncertainty of a mapped location may be expressed as a variance of a probability distribution, such as a two or three dimensional gaussian probability distribution. If either the positional sensor (e.g. IMU) or environmental sensor (camera) is noisy, there may be a range of positions that may account for the true location of a mapped object. For example, if in a first pass, the IMU reading indicates that the vehicle is to the left of its true location, then the object that is detected during that first pass may be mapped to a location that is to the left of its true location. If, in a second pass, the IMU reading indicates that the vehicle is to the right of its true location, then the objected that is detected during the second pass may be mapped to a location that is to the right of its true location. Accordingly, after the first two passes, the mapping system may determine that the most likely position of the object is between the estimates from the first or second pass, and the mapping system might additionally assign an uncertainty to its estimate that scales with the distances spanned by individual estimates. Similarly, positional estimates that are ahead of or behind the true location of the vehicle may create uncertainty in the object's location in the forward/backward dimension. In this way, positional uncertainty can contribute to increases in variance of as positional estimate for each mapped object.

If the IMU were completely noiseless, and if offsets between the camera and the IMU were precisely known, the resulting mapped position of the object may have a low uncertainty. If there is some misalignment, however, between the estimated offsets of the IMU and the camera, then the uncertainty of the mapped position may increase. As just described, noise in the IMU may contribute to uncertainty of mapped objects. Similarly, mischaracterizations of the offsets between the camera and IMU may contribute to the uncertainty of mapped objects.

As described below, certain patterns of mapping errors that may result from mischaracterizations of camera extrinsic parameters (for example, the pose of the camera relative to a positional sensor) may be used to systematically adjust camera extrinsic parameter settings.

In addition to the sources of error just described, one other source of error may be based on detection location errors of an environmental sensor alone, or in conjunction with an object detection algorithm. For example, if the environmental sensor includes a deep neural network that outputs bounding boxes around objects of certain types corresponding to the locations of those objects in image sensor data, then any misalignment between the outputted bounding box and a true bounding box may be considered another source of mapping error.

Object Recognition to Determine that an Object is not Moving

A method for joint reduction of uncertainty of object locations, as just described, may include reading measurements from one or more positional sensors and one or more environmental sensors that are rigidly attached to a vehicle. An environmental sensor may include processing by, for example, a deep neural network, so that the positions of objects relative to the vehicle may be determined in the sensory data, based, for example, on the positions of those objects as they appear in the visual data captured by the image sensor of a camera. The extent of visual data captured by the image sensor of the camera may be referred to as the field of view of the camera.

The system may then estimate the locations of objects of a known type. The locations of objects that are known to be stationary, such as traffic signs and lights, fire hydrants, and the like, may be selected for mapping. Likewise, detected objects that are known to be non-stationary, such as pedestrians and other vehicles, may be ignored. By focusing on objects that are known to be stationary, the system may more quickly and robustly settle upon a set of calibration parameters that can provide a desired level of uncertainty across mapped objects.

Figure 5:
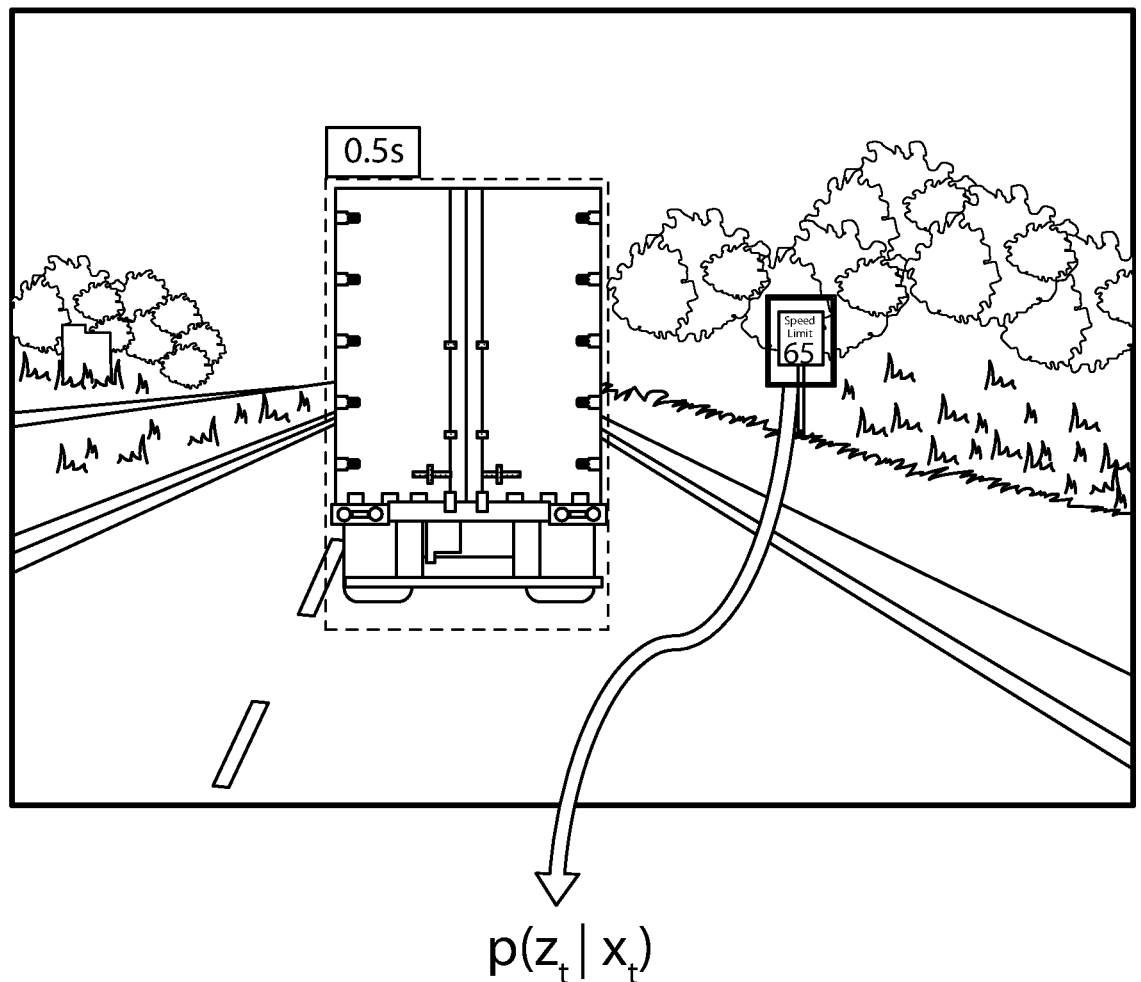
FIG. 5 illustrates an example of vehicular sensor system calibration in accordance with certain aspects of the present disclosure.

FIG. 5 illustrates the output of a Deep Neural Network based on a typical image captured by a windshield-mounted camera. In FIG. 5, the back of a truck and a speed limit sign are detected. Bounding boxes are placed over these two objects to indicate where in the image the Deep Neural Network has detected each object. Because a truck is often a non-stationary object, the back of the truck may be ignored. Conversely, because a speed limit sign is typically a stationary object, the speed limit sign detection may be used in an Observation model, as illustrated in FIG. 5. In some embodiments, data points corresponding to object detections that are selected for use in an observations model may be referred to as elements in a calibration database. In some embodiments, data corresponding to the speed limit sign detection may be selected for inclusion in the calibration database on the basis that speed limit signs tend to be positioned near to a road. In this example, given the pose of the camera, which may have been estimated from the motion model, the location of the speed limit sign may be estimated as a probability distribution.

Calibration may be based on visual tracks of multiple detected and tracked objects. A method may generally include detecting an object of a class that is known to be stationary and near a road, such as a traffic sign, traffic, or road marking. The object may be tracked across multiple frames. The perception engine, therefore, may be used to determine first, that an object is present, and second, that the object is not moving. In some embodiments, a perception engine may refer to a processor located within the vehicle that receives visual data from a camera affixed to the vehicle, and detects and determines the positions of objects within the received visual data. In some embodiments, the perceptual engine may further determine an object class to which the object belongs. For example, the perceptual engine may determine that the speed limit sign belongs to an "traffic sign" object class.

Multiple methods of determining that an object is not moving are contemplated, including visual inertial odometry techniques. By restricting attention to visual objects that are recognized to belong to a class that tends to be stationary, however, certain computations associated with estimating movements of the object may be skipped, thus conserving computational resources on the edge device. In addition, by having an object-recognition-based method of determining that an object is stationary, few false detections of objects that are actually moving slowly may be avoided. It may be appreciated, for example, the slow-moving vehicles in stop-and-go traffic may be automatically ignored for the purposes of mapping and localization.

A camera sensor combined with a neural network may process an image to determine a location of an object in the image. The location of the object in the image may then correspond to a ray (a line beginning at a point and extending in one direction) that starts at the estimated location of the camera at the time associated with the image frame, and that extends in the direction of the angular pose of the camera and further adjusted for the location of the object within the image. That is, an object detected on the right side of the image will have a corresponding ray that points to the right of a ray that corresponds to an object that was detected on the left side of the same image.

Each detection within a series of detections of the same track may be represented by a ray. In some embodiments, the plurality of rays may be combined into a vector corresponding to detections of a tracked object. In some embodiments, the starting point of each ray may be a camera location as determined from a relative positional sensor. The direction of each vector may then correspond to a location within the camera's image plane where the object was detected. A numerical method may be applied to determine a fit, whereby vehicular calibration parameters are determined so that multiple detection vectors associated with a series of object detections intersect at a common point. In some embodiments, the numerical method may comprise a computation of a covariance matrix. The covariance matrix may yield a positional uncertainty about the detected object.

For vehicular sensor calibration using object locations, certain aspects of the present disclosure provide methods by which rays drawn from estimated vehicle locations and in the direction of a detected object may be adjusted. Prior to the adjustment, the different rays may intersect at various locations. The typical spread of these points of intersection may correspond to the uncertainty of the object location. Then, based on certain teachings described herein, the offsets between the environmental and positional sensors may be adjusted so that the points of intersection become more narrowly grouped. Techniques for this adjustment include manual techniques and error reduction algorithms that iteratively make small adjustments until the errors are lessened to an acceptable level.

In one embodiment, a Penrose inverse computation may be employed to calculate a point that is closest to the intersection of the detection rays. In this example, this point may be considered the point of intersection of the rays, even if none of the rays actually pass through that point. Accordingly, the tightness of the intersection of the rays may be considered a mean or median distance between the Penrose inverse point and the object detection rays.

Filtering Object Detection Tracks Based on Detection Quality

Attempts to calibrate vehicle sensor system parameters based on the techniques just described may not yield repeatable or reliable estimates, and/or may be unacceptably sensitive to initial estimates of calibration parameters. In this section, novel techniques and novel combinations of techniques for filtering of object detection tracks based on detection quality are described. In many contexts, an additional step of filtering object detection tracks may enable reliable and repeatable estimates of vehicular camera calibration parameters, as disclosed herein.

In some embodiments, a method of filtering object detection tracks may comprise pruning a set of object detection rays that are considered prior to the application of a numerical technique to adjust or estimate calibration parameters. For example, it may be advantageous to restrict attention to rays having angles that are larger or smaller than the most commonly observed rays. When passing by a sign, or when turning a corner in the vicinity of a sign, the ray angles from the camera to the object may be atypical. In contrast, when viewing a sign from a distance, multiple successive observations of the sign may yield a nearly identical ray angle. By computing a median ray angle, for example, and then over selecting ray angles that are far from the median, the accuracy of the object localization may be increased. In some embodiments, overs electing ray angles that are far from the median may refer to a selecting a subset of potential data points for inclusion in a calibration database, wherein the likelihood of inclusion is based on how much the corresponding ray angle deviates from the median ray angle.

According to certain aspects of the present disclosure, a set of object detections may be filtered based on various metrics of detection quality. Metrics of detection quality may include log probability associated with an object class, variance in aspect ratios of bounding boxes associated with a sequence of detections across frames, a number of detections, a hit rate of detections from the start to the end of a series of detections in a track, and the like. In one example, the set of object detections may be filtered so that objects detections associated with tracks of less than 5 consecutive detections may be excluded. Because some objects detections may be unreliable, such a filtering step may eliminate a substantial amount of noise, which may enable a numerical method to more quickly and reliably converge on a set of calibration parameters that can account for a large portion of the higher quality detections.

Alternatively, or in addition, filtering may be based on the relative position trajectory of the vehicle while an object was detected. For example, if the object was detectable for a relatively long period of time, but then was obfuscated when the driver actually passed it, the range of detection angles may be narrower than a filtering threshold. In some embodiments, the numerical method may be applied selectively to object detections associated with 'drive-by' trajectories.

Alternatively, or in addition, filtering may be based on a maximum deviation of the rays. For example, series or tracks of object detections for which all of the rays only deviate by 2 degrees may be excluded. For a vehicle-mounted device that views a large number of objects, object tracks for which ray angles deviate by less than 7 degrees may be excluded. In some embodiments, a range of ray angles associated with a detected object may be used as a measure of the maximum deviation of the rays.

Alternatively, or in addition, filtering may be based on how far the vehicle has moved during the course of the series of object detections. In one embodiment, object detection tracks associated with vehicle trajectories at least 1 meter in length may be included and the rest excluded. In some embodiments, a vehicle movement threshold might be combined with an angular change threshold. Object detections associated with curved trajectories, such as U-turns, may provide more information per detection that detections associated with straight trajectories. Accordingly, a vehicle movement threshold may be configured so that even short object detection tracks are included if they are detected while the vehicle is turning. In some embodiments, object detections observed during sharp turning movements may be discarded depending on the availability of IMU and GPS sensor fusion. GPS alone may be known to exhibit turning lag errors, which could systematically degrade vehicle location estimates associated with turns. If IMU readings are fused with the GPS module, however, these lag errors may be reduced, and so may be outweighed by the relative benefit of a wide diversity of detection ray angles accompanying turns.

In some embodiments, there may be an additional application of a weighting scheme. In this example, a numerical method may be applied to determine a set of calibration parameters that yields a tight intersection of detection vectors, but the vectors may not all be considered equally. Due to typical road geometries and vehicle trajectories, many detection vectors may be considered to add roughly the same information about the location of the detected object. Without discarding redundant detection vectors and/or weighting them differently, a numerical method may be overly influenced by highly redundant observations, even though the atypical detection vectors may be the most informative.

A weighting scheme may be achieved using a weighted subsampling. In this example, all detection angles may be considered to determine a median ray angle. Subsequently, a deviation from the median angle may be computed for each detection vector (ray). According to certain aspects of the present disclosure, the rays with the highest angular deviation may be assigned the highest weight. In some embodiments, weighted sampling over those rays may correspond to a random process whereby the weight of a ray corresponds to the likelihood that it will be selected. In some embodiments, detection vectors may be interpolated between observed detection vectors. In such embodiments, a higher number of interpolated detection vectors may be selected around observed detection having a higher weight. Interpolation of detection vectors may be additionally modified with a noise model. The noise model may describe the uncertainty about the position of the object given the actual detections.

In a set of object detection trajectories, there may be a range of positional uncertainties associated with each object. If a co-variance of a positional uncertainty associated with a particular object is substantially larger than typical covariances, then the object detections associated with that object may be discarded. In this way, problematic object detections, such as object detection tracks that are actually associated with two similar objects that are near each other, or that are observed in highly unusual lighting conditions that pose challenges to the perception engine, may be excluded from the computation of vehicular calibration parameters.

It will be understood that including or excluding object tracks may be accomplished by a combination of weighting and selection. In one example, excluded object tracks may be deleted from a set of object detection tracks that are submitted to a numerical parameter fitting method. In a second example, excluded object tracks may be assigned a smaller weight relative to the included tracks. In still another example, excluded object tracks may be deleted from the sample, and included object tracks may be assigned different weights according to quality metrics. In another example, excluded object tracks may be assigned a weight of zero.

Multiple Relative Motion Trajectories of Driving Past an Object

As described above, it may be advantageous to capture multiple images of the same object in an object detection track. In the vehicular context, this may be accomplished by driving by the object. For an environmental sensor that does not contain a depth estimate, multiple detections from a moving vehicle may enable an inference of a distance to the object.

According to certain aspects, environmental sensor data collected while driving past an object may be filtered to determine if the location of the object may be estimated to a desired level of accuracy. Objects that are viewed at the end of a long tunnel, for example, may not be observed from a diverse enough set of locations to yield an acceptable positional uncertainty. In this example, the visual data may be sufficient to indicate that an informational sign is at the end of a tunnel, for example, but may be insufficient to provide an estimate of how far away the object is from the camera. As the vehicle continues to approach the informational sign, however, the angle to the sign may start to deviate from the vanishing point. Based on images collected closer to the time that the vehicle drives by the sign, it may become possible to determine a suitably accurate estimate of the location of the sign.

The above technique may be performed with a plurality of detectable objects. After reducing the uncertainty of the locations of several objects in three-dimensional space, certain other aspects of the present disclosure may then be applied, and/or the certain aspects may be applied a second time, to orient and ground the map to a road surface. As will be appreciated, when the offsets between an IMU and the camera are unknown, the resulting map may include a roughly planar arrangement of mapped objects, but the plane that appears to support the mapped objects may be tilted away from a horizontal plane. Accordingly, the resulting plane may be re-oriented so that it is substantially horizontal. By this same step, the orientation of the camera sensor relative to the IMU may be determined, because the true orientation between the two may be approximated by the rotations required to achieve a substantially planar arrangement of mapped objects.

Pitch, Roll, and Yaw Estimates from Object Detections and Relative Position Estimates In certain embodiments of the aspects of the present disclosure, vehicular sensor calibration may be achieved in a sequential manner. For example, a joint reduction of uncertainty of observed object locations and a limited number of calibration parameters may be determined using a relative position sensor. In such embodiments, relative positioning between the camera and the absolute positional sensor may be accomplished separately.

A relative positioning sensor package may have a characteristic accuracy over a given duration or distance travelled. For example, relative position readings for a typical, inexpensive off-the-shelf IMU may be accurate to within 5 centimeters over 20 seconds, and within 10 centimeters over 50 seconds. While other IMU packages may offer similar accuracy over minutes to hours, such systems may be prohibitively expensive.

Accuracy of a commercial grade IMU tends to improve when it is at rest. In the vehicular context, periods of rest are common while the vehicle is parked. Vehicles are again typically at rest when the vehicle is idling at a red light. According to certain aspects, IMU readings may be referenced to readings taken when the vehicle was idling at an intersection. For a vehicular sensor system than includes wheel odometry, idling detection may be determined based on a lack of updates from the wheel odometry sensor. In some systems, visual detection of a red light, coupled with tracked bounding boxes of stationary objects may be used to determine that the vehicle is at rest. At these times, inertial sensor data may be re-referenced. This process may better account for drift in different IMU components.

Alternatively, or in addition, periods of idling at intersections may be used to create and/or update a lookup table of IMU bias at different device temperatures. For an accelerometer, IMU bias may be determined by subtracting off a physically known gravitational vector associated with the vehicle's location on the earth. In another example, a typical gravitational vector associated with the general region in which the vehicle travels may be used, such as a gravitational vector value of 9.81 meters per second squared. This latter technique may avoid computations associated with determining a gravitational vector for each visited location.

The drive-by tracks may not depend on where the vehicle was on earth when it was driving by the object but may only depend on its trajectory since it first detected an object in a track. Therefore, in some embodiments of certain aspects of the present disclosure, if accurate relative positioning over a short period of time is available, further use of absolute information may be avoided. Calibration of pitch, roll, and yaw of an environmental sensor may be determined in this way.

In this approach, computations associated with determining that the viewed object is the same one that was viewed on a previous trip may be skipped. This may save certain computations and avoid object matching errors. In addition, this technique may work reliably in GPS-denied environments, such as inside of parking structures or warehouses.

Keypoints within Objects

In some embodiments, after objects are detected by the environmental sensor, the system may then subsequently detect keypoints (e.g. high-contrast corners within an image) within those detected objects. This technique may therefore make use of a larger number of detected points to more quickly and accurately constrain the mapping of any given object.

Furthermore, by effectively ignoring keypoints that are not associated with known objects, the system may implicitly ignore several classes of keypoints that may negatively affect localization. Example of such keypoints may be ones associated with leaves on trees, with corners on moving vehicles, and the like. In some cases, using keypoints without first restricting attention to known visual objects may yield phantom keypoints that are associated with objects that are transiently aligned from the viewpoint of the camera in one frame but that are actually spaced from each other.

After collecting a suitable number of observations, a numerical technique may be employed to jointly reduce the uncertainty associated with multiple detected objects. In one example, the Broyden-Fletcher-Goldfarb-Shanno (BFGS) algorithm may be employed in an iterative fashion until a desired mean or median object location uncertainty is achieved. The resulting parameters may then be used as calibration parameters for the vehicular sensor system.

Figure 6:
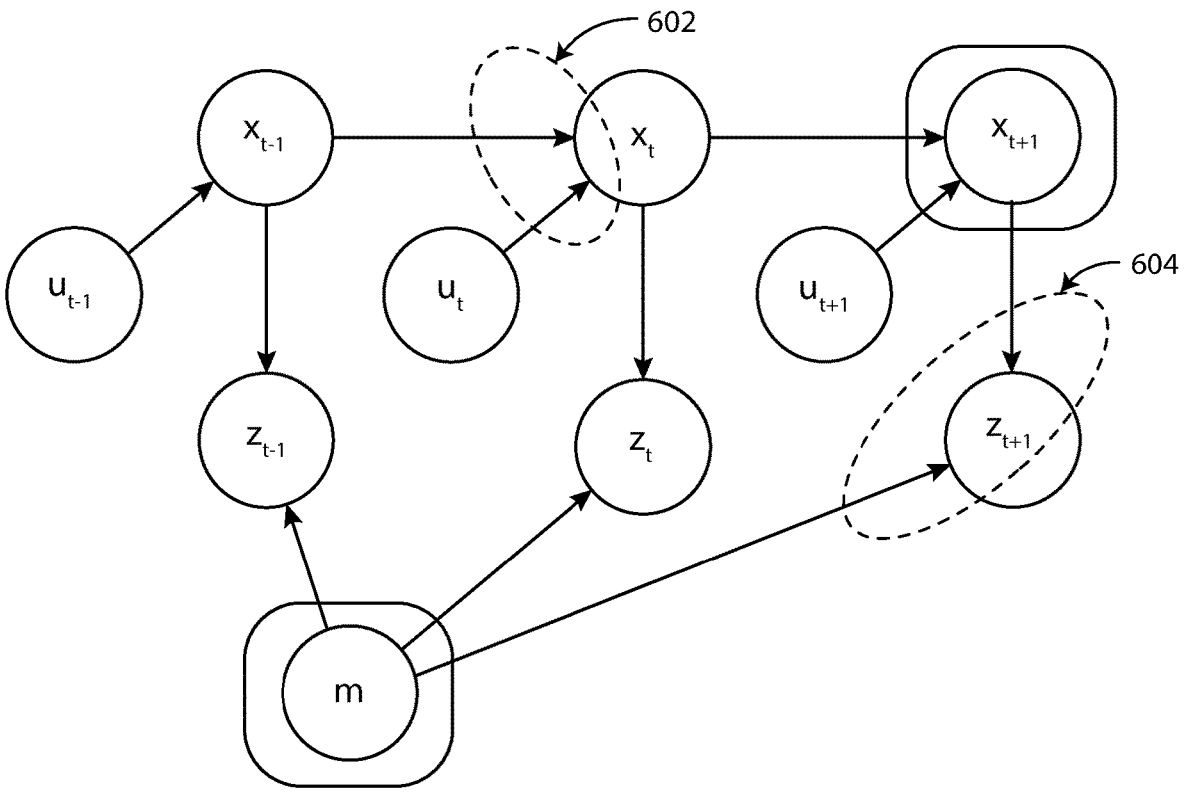
FIG. 6 illustrates an example of vehicular sensor system calibration in accordance with certain aspects of the present disclosure.

FIG. 6 illustrates a collection of pose estimates $(x_{t-1}, x_t, x_{t+1})$, movements $(u_{t-}, u_t, u_{t+1})$, and observations $(z_{t-1}, z_t, z_{t+1})$ that may then be incorporated into a numerical technique, such as BFGS, to estimate vehicular sensor system calibration parameters.

Figure 7:
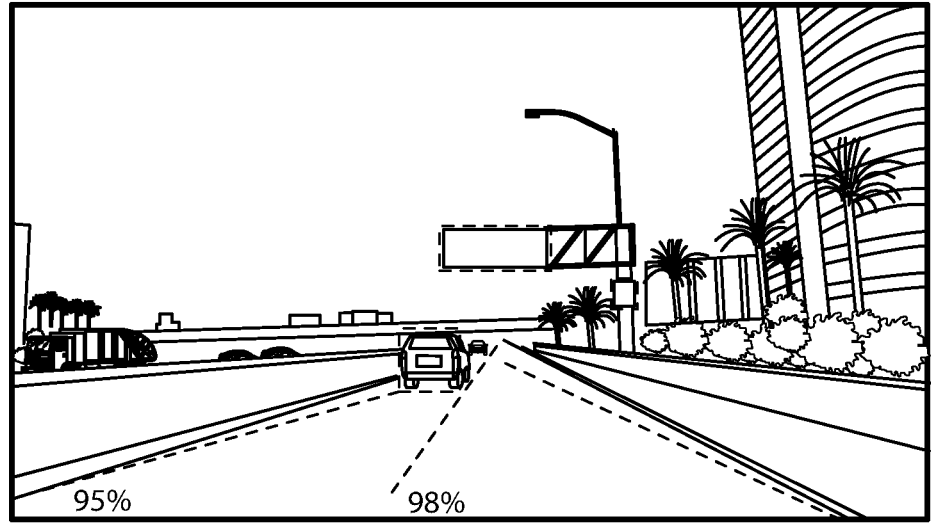
FIG. 7 illustrates an example of vehicular sensor system calibration in accordance with certain aspects of the present disclosure.
Figure 7:
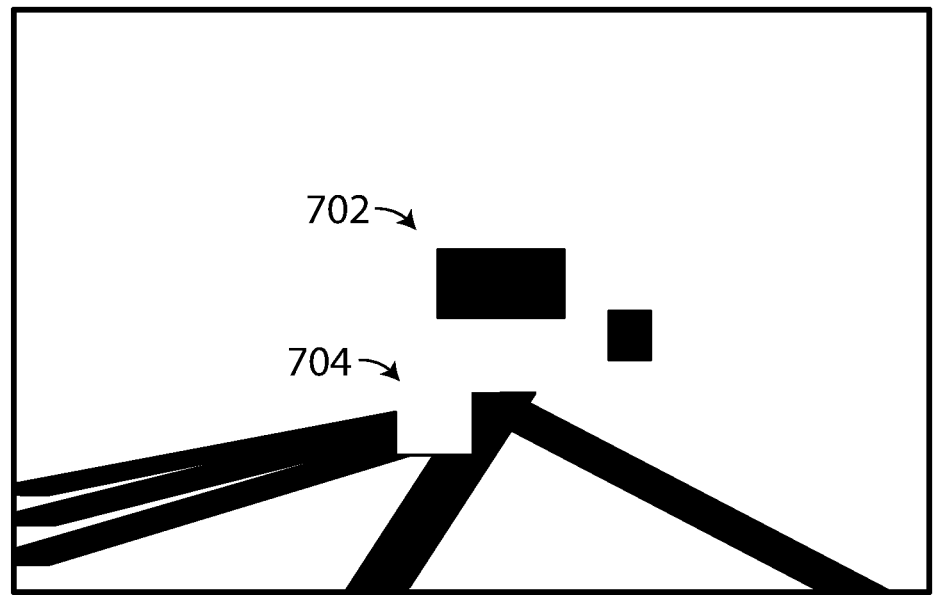

FIG. 7 illustrates masking of keypoints based on recognized object classes. In some embodiments, keypoints may be determined within portions of the image where a stationary object has been detected. By limiting a search for keypoints to these locations in an image, computational resources may be conserved. At the same time, the likelihood of detecting spurious or false keypoints may be decreased.

In some embodiments, keypoints within detected objects may be individually mapped. In one example, outer corners associated with informational road signs may be mapped individually. In comparison with an embodiment of certain aspects of the present disclosure in which an informational center point is mapped, mapping of object corners may provide greater accuracy as well as richer information. For example, in some conditions, a three-dimensional orientation of an informational sign may be mapped. This may assist an IDMS, ADAS, or autonomous driving system by, for example, determining that a stop sign is oriented in the direction of an adjacent road and is not applicable for the road on which the vehicle is travelling.

Sequential and Parallel Sensor Fusion

Figure 8:
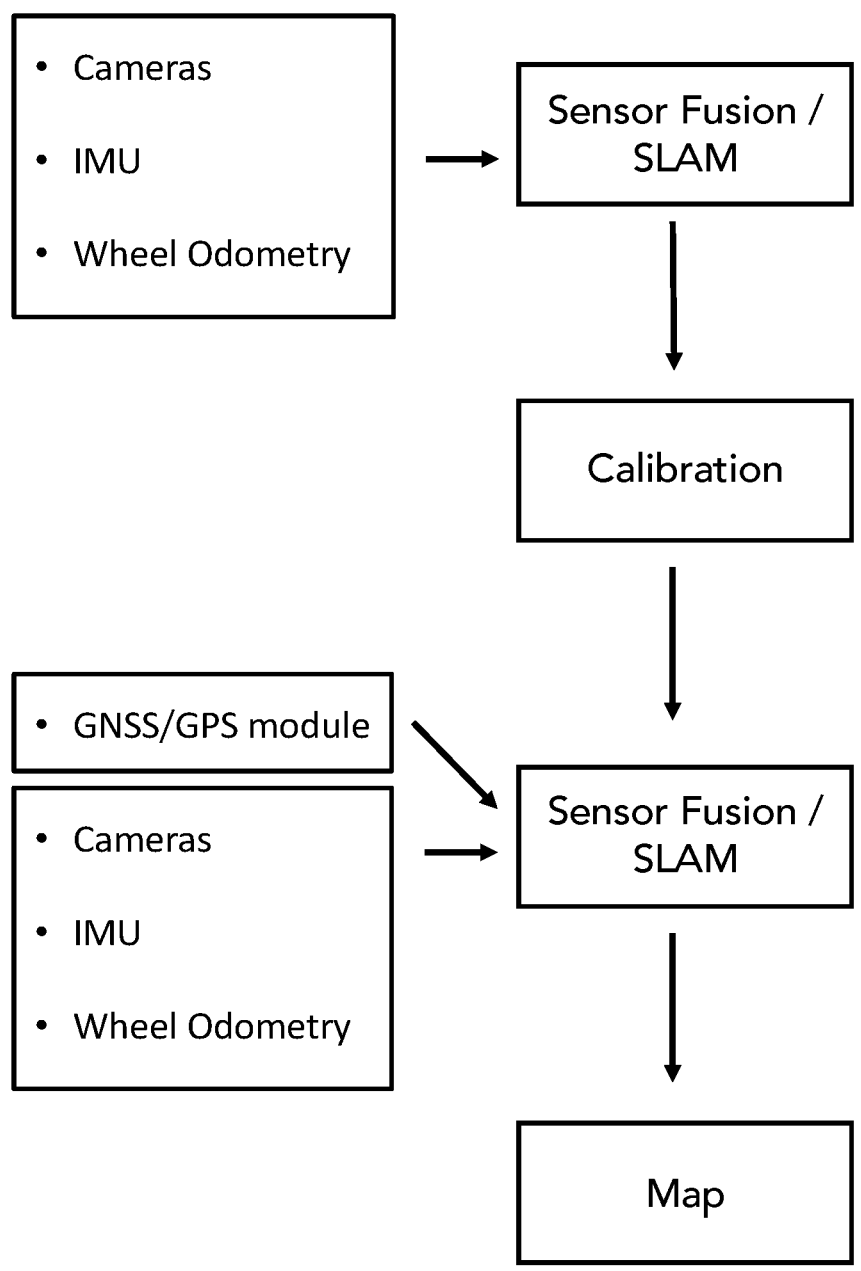
FIG. 8 illustrates an example of vehicular sensor system calibration in accordance with certain aspects of the present disclosure.

FIG. 8 illustrates that a SLAM algorithm may produce a Map with or without a separate calibration step. The Map may then be used to improve the Calibration. With better calibration, subsequent mapping may be relatively refined.

In one embodiment, GNSS and IMU sensor information may be combined to estimate a heading of the vehicle or the device. This combined signal may also be referred to as an output of a GNSS-INS or GNSS-IMU. The GNSS-IMU may then be combined with wheel odometry for an improved pose estimate (pitch, roll, yaw), as described below. In some embodiments, a pose estimate may include an offset of the camera sensor relative to direction of heading of the vehicle. A determination of a translation (x,y) relative to an anchor point (i.e. the start of a trip) may be based on GNSS and the combination of the IMU and wheel odometry.

Visual data is captured by a camera sensor. The camera pose, which may be estimated according to the method just described, may then be used to relate objects and lines that are detected in visual data (i.e. in the camera plane) to locations in the surrounding world. In an embodiment of certain aspects of the present disclosure, a neural network (e.g. deep learning model) may be used to detect one or more objects and lines in visual data. Examples of visual objects include stationary road signs, such as stop signs, speed limit signs, and the like. In certain aspects, the deep learning model may also detect lane lines and road boundaries, including inferred lane lines in visual data.

Several systems and methods of detecting objects and lane lines are contemplated, including systems and methods that are disclosed in U.S. patent application Ser. No. 15/437, 646—"DRIVER BEHAVIOR MONITORING" filed 21 Feb. 2016 and PCT Application PCT US/2018/54732—"SYSTEM AND METHOD OF DETERMINING A CURVE" filed 5 Oct. 2018, each of which is incorporated herein by reference in its entirety. Several systems and methods of Traffic Boundary Mapping are disclosed in PCT Application US 19/23766—"TRAFFIC BOUNDARY MAPPING" filed 22 Mar. 2019, which is incorporated herein by reference in its entirety.

Various signals may be combined through a motion model. With a motion model, the next position of a particle in a particle filter may be a prediction. Given a determined heading and velocity, the location of a device a short time later may be predicted. In one embodiment of certain aspects of the present disclosure, the different particles of a particle filter may incorporate differing amounts of noise.

Figure 9:
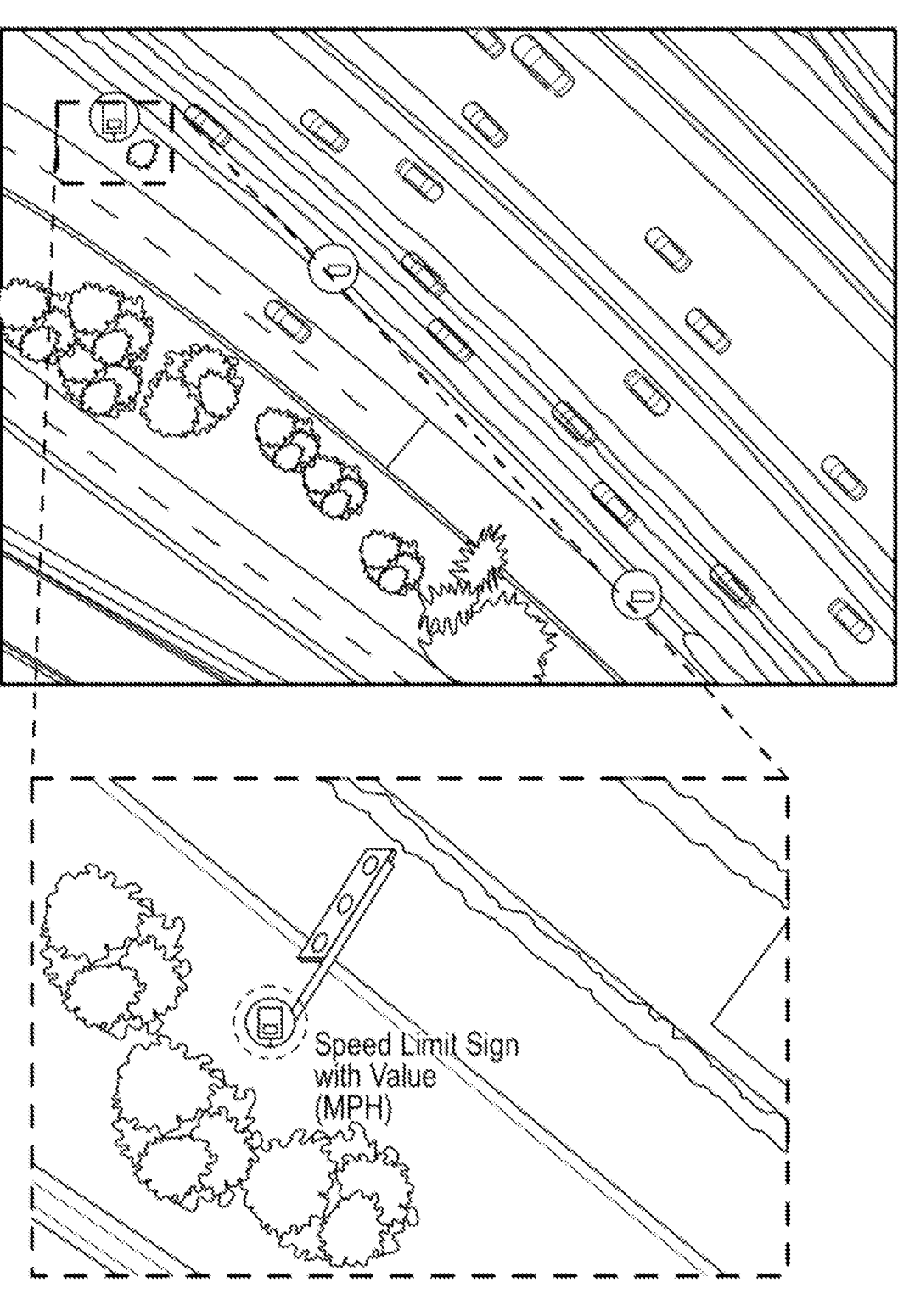
FIG. 9 illustrates an example of vehicular sensor system calibration in accordance with certain aspects of the present disclosure.

FIG. 9 illustrates mapping of a speed limit sign in accordance with certain aspects of the present disclosure.

Figure 10:
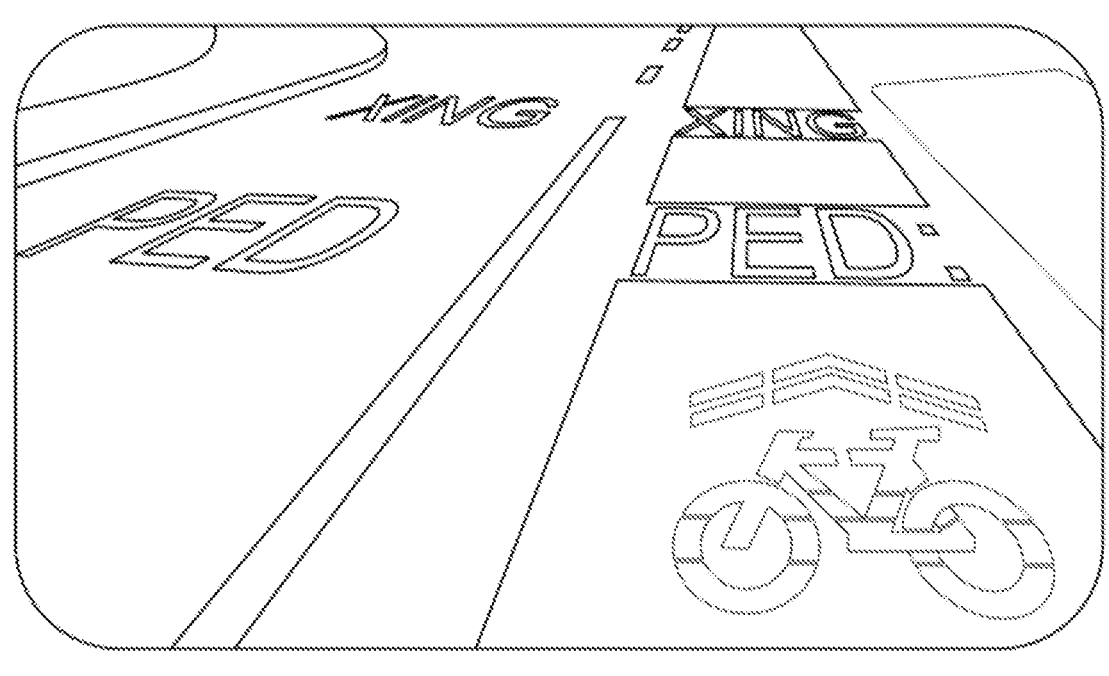
FIG. 10 illustrates an example of vehicular sensor system calibration in accordance with certain aspects of the present disclosure.
Figure 10:
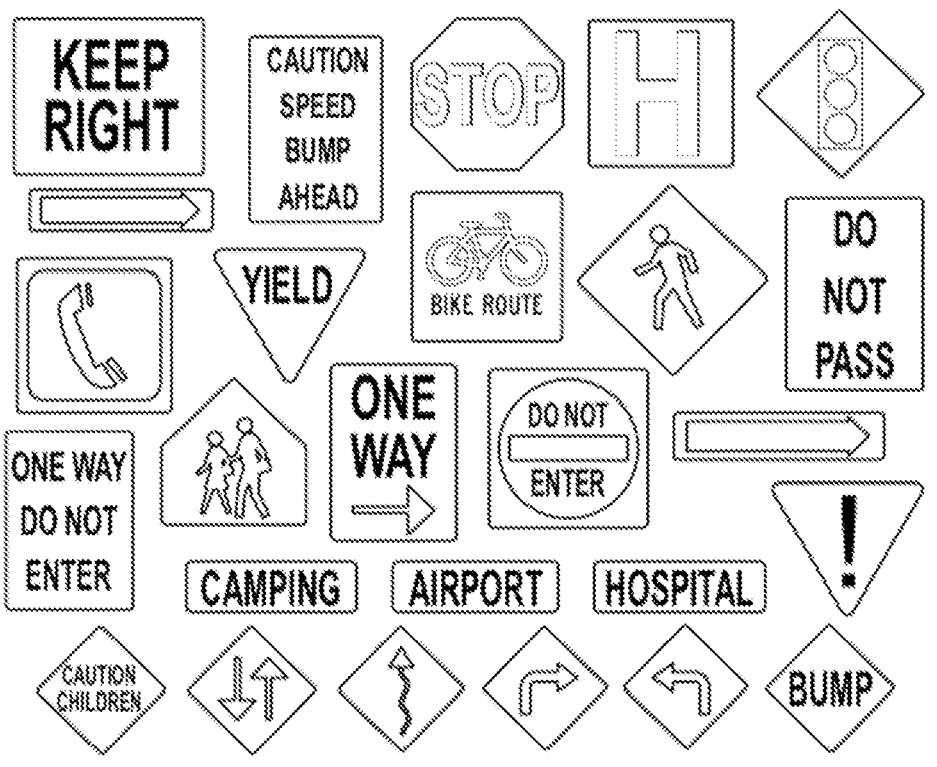

FIG. 10 illustrates a variety of road markings (top) and signs (bottom) that may be mapped in accordance with certain aspects of the present disclosure.

Traffic Boundary Mapping

Certain aspects of the present disclosure may use monocular vision to detect lane lines and road boundaries, and then use these detections to determine how to update an occupancy grid in a modified GridSLAM framework. Lane lines may include visible lane lines, road boundaries, and inferred lane lines. According to certain aspects of the present disclosure, the distance of visually detected objects, such as lanes, may be projected into an occupancy grid based on an estimate of a camera's pose. Occupancy grid localization based on monocular vision may be challenging because single frames may not uniquely specify a distance to detected objects. Certain aspects of the present disclosure build upon recent advances in lane detection disclosed in PCT Application PCT US/2018/54732 mentioned supra, and accordingly other aspects of mapping and/or localizing based on detected lane positions herein disclosed are novel.

According to certain aspects, a "Mexican-hat" kernel may be applied to an occupancy grid to estimate a true position of lane lines and/or road boundaries. Because there may be uncertainty about the position of the vehicle when the lanes are detected, a "Mexican-hat" kernel may provide a center-on, surround-off filter. This approach may also be substantially faster and less resource intensive than an occupancy grid approach that counts all negative as well as positive detections.

PCT Application PCT US/2018/54732, mentioned supra, teaches systems and methods for determining inferred lane boundaries, including lane boundaries that are not indicated by any road markings. One example of an inferred lane boundary may be an offset from a row of parked cars. Using a DNN approach, as herein disclosed, an inferred lane may be detected in visual data from a camera coupled to a moving vehicle. According to certain aspects, such inferred lanes may then be mapped. Likewise, a map of inferred lane lines may be used to help determine a location of a vehicle, an indication of where an autonomous vehicle should drive, where to park, and the like.

According to certain aspects, SLAM may be performed simultaneously on an occupancy grid for the lanes and the road boundaries and for point objects like stop signs and speed limit signs. By doing both of these simultaneously a correspondence between lanes and object locations within a desired error bound may be achieved. In a particle filter based FastSLAM framework, each particle may store and update its own version of the landmark/point object map. According to certain aspects disclosed herein, GridSLAM may be combined with FastSLAM so that every particle may store and update an occupancy grid map along with the landmark/point object map with an additional condition that both the maps are stored with respect to the same world coordinate system and origin.

When particles are resampled (e.g. at regular intervals), the particle weights may be derived from a measure of consistency between observations and the two maps. For example, an occupancy grid may include a larger number of points than a landmark map of a similar geographical area. If resampling were based on the number of points, then the occupancy grid might dominate the resampling process. These measures of consistencies may be weighted between the occupancy grid map which may be dense and the landmark/point object map which may be sparse. Tuning this weighting for different environments during mapping may improve the accuracy of a resulting map. Accordingly, certain methods are disclosed to balance the occupancy grid and landmark map representations in the sampling process. For example, the resampling may be based on a low-pass filtered metric relating to the number of visual objects and lane lines detected in recent frames. The weighting for resampling purposes may alternatively, or additionally, be based on auxiliary factors, such as a determined weather, lighting condition, geographic location, and the like.

According to certain aspects, rather than using dense, featureless points for fine-grained localization, combined with infrequent landmarks for global positioning, an embodiment may use recognizable landmarks to estimate the device position, subject to soft constraints introduced by the surrounding occupancy grid. For example, the grid/lane representation may be useful for determining that a driver is in the first lane or the second lane, but not so useful at determining his position along the street (along the direction of the lane line) particularly for straight lanes. In this regard, lane data may be a useful constraint for particle filter resampling. Likewise, when lane lines are not reliably detectable, the system may automatically rely more heavily on GNSS-INS fused with wheel-odometry. In some cases, these estimates may be further constrained by visible landmarks.

Elevation Estimation of Visual Landmarks Using Topographic Information

It is well-known in the art that a GNSS module based on received satellite signals may provide a poor estimate of height. This may cause an issue for mapping in a hilly area.

If coming down a hill, traffic lights may be below the vehicle, even though the traffic lights are suspended above the road. In this example, a lack of knowledge about the topography of the road could lead to estimates that stop lights are below the road, but when the device approaches the intersection, the traffic lights may be above it. For this reason, among others, it may be desirable to map the height of a road in addition to the locations of markings on its surface. In practice, however, a full three-dimensional model of road surfaces may be too unconstrained to be practically solved.

According to certain aspects of the present disclosure, satellite-based national cm-level topographic info may be utilized. When doing the mapping, an enabled system may incorporate height information from this database. A first GNSS measurement, or a trajectory comprising a number of GNSS measurements, may provide a lat/long that may then be used to look up the topographic height at those points.

Public government data may be available over the entire US every at a 10 m resolution (spacing between data points), and with an accuracy that is a few centimeters in height. According to certain aspects, an enabled system can retrieve a set of lat-lon points (a path). A boundary around the path with a given thickness may be used to look up heights. A grid interpolation algorithm may then be used to interpolate onto that path. In some cities, the available topography data may be resolved at a higher resolution. For example, in San Diego, there is 1-m resolved topography data available based on LiDAR readings from aerial vehicles. That is, public data are available that provide the height of any given square meter of the road in San Diego.

By using this 3D information from an independent source, the mapping process can operate under a simplifying assumption that the road exists on a 2D road plane, with the camera or cameras mounted at a substantially fixed height above that plane. Accordingly, objects that are detected may still be mapped to accurately determined 3D positions (in the 2D plane plus a height). In some embodiments, mapped objects may also have roll, pitch and yaw. As discussed below, objects may also have semantic labels and/or probabilities.

Mapping of Static Objects with Semantic Labels and Crowd-Sourcing Considerations According to certain aspects, a map of landmarks may include labels having a semantic meaning. Semantic meaning may be enabled because the system makes use of detected visual objects, such as objects having a behavioral relevance in the context of a behavioral monitoring application.

Semantic labels may have an impact on the efficiency of data transmission, that is determining what should be transmitted from an edge computing device to a cloud server. In one embodiment, bounding boxes of detected objects may be transmitted along with a semantic label. Alternatively, or in addition, an estimate of the location of the identified object may be transmitted to a cloud server. In some applications, stationary objects may be prioritized with respect to moving objects for the purposes of mapping. For example, data relating to detections of static objects may be used for bundle adjustments in the cloud. In some embodiments of the present disclosure, a computer program product may configure more than one processor to perform different aspects of a a method. For example, in some embodiments, a processor that is located within or on the vehicle may process visual data that are captured by the camera affixed the same vehicle. A second processor may be configured to perform bundle adjustments in the cloud, which may be understood to mean that the second processor may operate at a location that is remote from the vehicle where the visual data are captured.

According to certain aspects, SLAM approaches may be leveraged to crowd-source and quickly update for accidents, road construction, and other changes. Another aspect herein disclosed relates to a determination of a behavioral map. For example, based on a determined trajectory and a determined position of a stop sign or a traffic light, a system enabled with certain aspects of the present disclosure may determine where drivers typically come to a stop at an intersection. This inference may be useful for determining a controller of an autonomous vehicle to drive in a more human-like manner. Similarly, certain aspects may be applied to determine how drivers behave in road-merging situations, roundabouts, and the like. Furthermore, certain aspects may be utilized to determine patterns of pedestrian interactions.

Assisted Manual Calibration of a Vehicular Sensor System

Manual Calibration of a vehicular sensor system may include measuring angles and offsets between a positional sensor, a vehicle sensor, and a reference point in or on the vehicle. Manual calibration may be time consuming and expensive, and furthermore, may not readily account for slight changes in the relative position of sensors. Still, in some applications of certain aspects of the present disclosure, manual calibration of vehicular sensor systems may be improved.

Figure 11A:
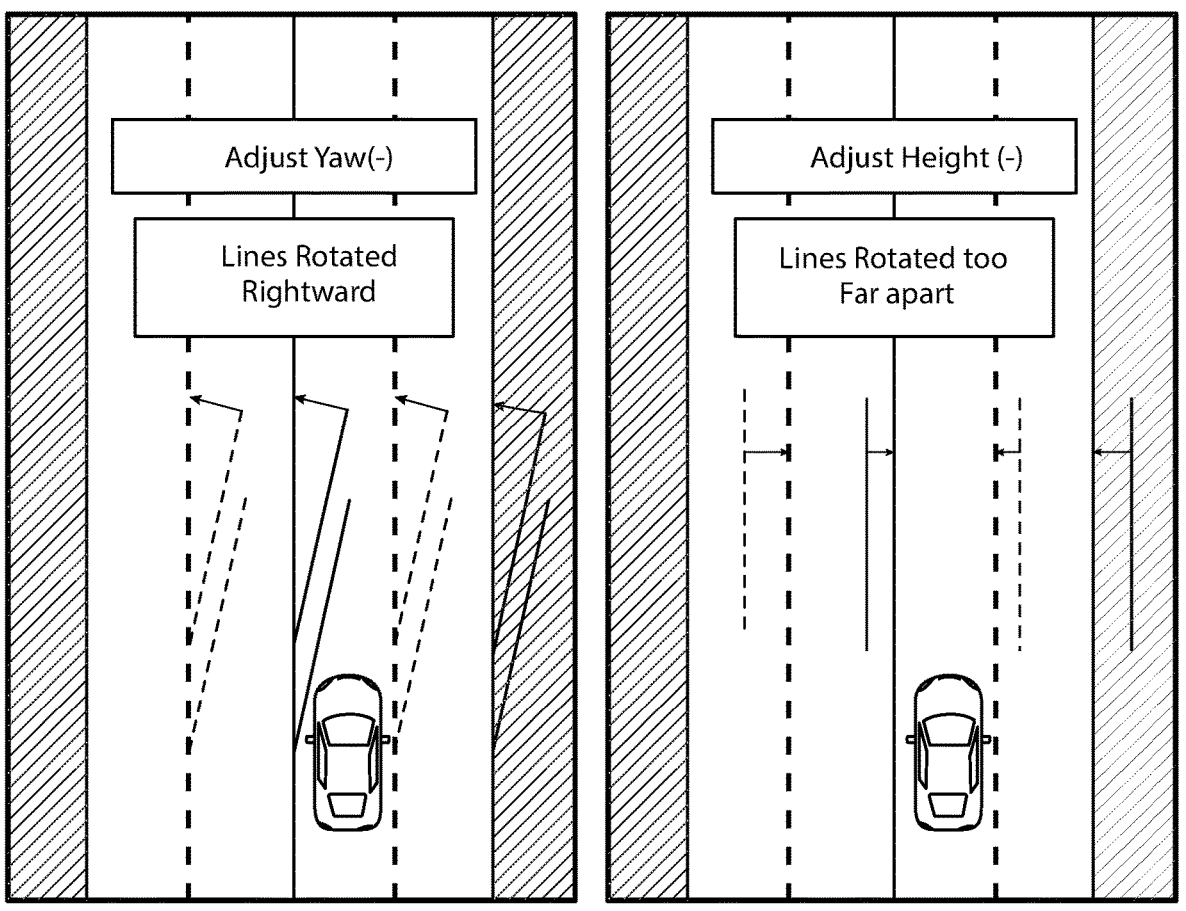
FIG. 11A illustrates an example of vehicular sensor system calibration in accordance with certain aspects of the present disclosure.
Figure 11B:
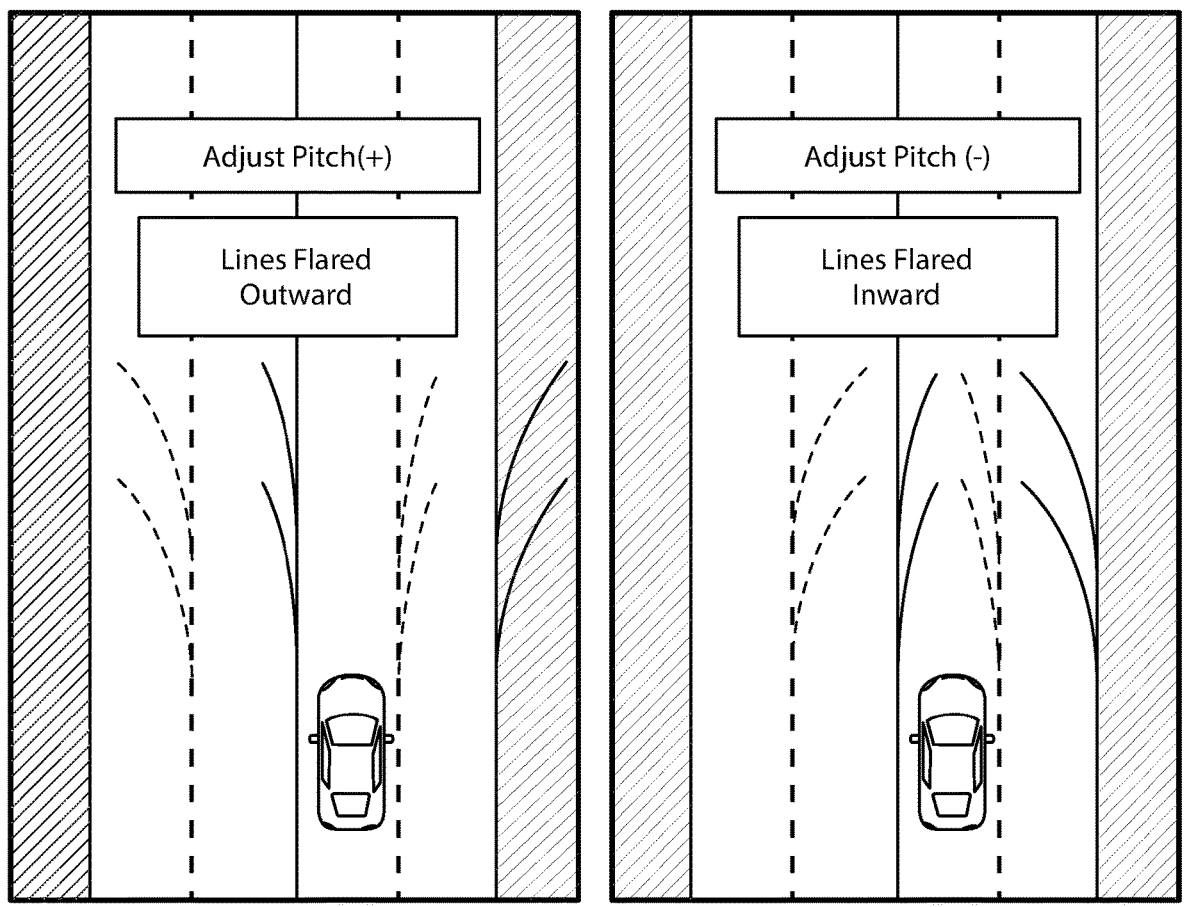
FIG. 11B illustrates an example of vehicular sensor system calibration in accordance with certain aspects of the present disclosure.

FIG. 11A illustrates mapping errors associated with detected lane lines, where the mapping errors result from errors in vehicular sensor calibration. Characterization of these mapping errors may be used to iteratively improve vehicular sensor system calibration. The following techniques, which will be described with reference to an assisted manual calibration procedure, may instead be applied in an alternative and fully automated fashion, as will be described in a later section. The text boxes indicate a type of error that may be observed. The illustrated examples in FIG. 11A include miscalibration of yaw (left), and camera height (right). FIG. 11B illustrates the kinds of errors that may be expected from miscalibration of pitch.

As illustrated in FIG. 11A, errors in camera calibration can lead to mapping results that may be contrary to what a normal driver would expect. Drivers may expect that most lane boundaries will be evenly spaced. While it may be true that while merging into traffic a driving lane may become progressively smaller, it may be more common for driving lanes to maintain a constant width. That is, a substantial fraction of detected driving lanes may exhibit a constant width, such as the standard twelve-foot width of highways in the United States. Furthermore, lane lines may tend to be continuous. Even dashed lane lines may tend to line up with each other. Because these understandings of lane line properties are violated when attempting to map visual detections using a mis-calibrated sensor, according to certain aspects, certain camera calibration parameters may be adjusted until the resulting maps no longer violate these understandings.

According to certain aspects, yaw and pitch calibration parameters may be estimated from detected lane lines. In one embodiment, the location of a vanishing point relative to an optical center of the camera sensor may be used to estimate yaw and pitch. Similarly, yaw and pitch calibration may be achieved with reference to road boundaries using the same vanishing point technique, assuming that the road boundaries are roughly parallel to each other and that a substantial fraction of them maintain a consistent width. Using road boundaries for camera calibration in this way may be useful in locations, such as in some rural areas, where roads are not consistently marked with lane lines.

In another embodiment, which is illustrated in FIG. 11A and FIG. 11B, lane line detections from multiple images captured during a vehicle trajectory may be projected onto a road surface plane. Certain characteristic disagreements between projected lane line segments and typical lane geometries may be used to determine the accuracy of pitch, yaw, and or camera height parameters. In this example, the image plane can be projected on to a local navigation plane (a flat plane corresponding to the road). In some embodiments each projection of lane lines detected in an image plane may be projected to the local navigation plane at a location corresponding to the location of the vehicle at the time the image was captured. Alternatively, based on an observation that the vehicle tends to drive in a straight trajectory at roughly constant speeds, positional sensor inputs may be ignored, and a substantially similar set of projections may be obtained by displacing each projection by a fixed amount.

As illustrated in FIG. 11A, if the calibration parameter corresponding to the camera's yaw angle is incorrect, then the projected lane lines may point away from the true direction of the lane lines with respect to the direction of travel. This can be observed by comparing projections from two or more image frames. As can be seen in FIG. 11A, the projected lane lines from successive frames do not overlap with each other. Rather, they are substantially parallel to each other and offset by the distance that the vehicle travelled between frames.

The approach of projecting lane line detections to a local navigation plane takes advantage of a common behavioral observation that drivers tend to drive within a lane, and further, that they tend to travel in the direction of lane lines. These behavior trends are not always correct. Accordingly, the method may include a step to filter out lane line detections that occur during lane changes, turns, in merge zones, and the like. Alternatively, such circumstances may be left to be averaged out, based on the further observation that lane changes are rare in comparison with lane keeping behavior. That is, a substantial fraction of lane line detections occur when the driver is not changing lanes, turning, or merging.

Furthermore, according to certain aspects, a refinement to the yaw-estimation method may involve determining a temporally local variance of a driver's position within a lane. Accordingly, the technique illustrated in FIG. 11A may be applied to captured data associated with times of relatively low lane position variance. It will be understood that similar filtering on lane position, the presence of lane changes, and the like, may improve the reliability of a pitch estimation, as discussed below in reference to FIG. 11B.

Returning to FIG. 11A, the angle of parallel lines relative to the trajectory of the vehicle may be determined. The trajectory of the vehicle may be determined based on a positional sensor, or by other means. For example, a linear fit of lane detection starting points may be computed as a proxy for the direction of vehicle travel. Based on several samples, the median angle of projected lane lines may be computed. The yaw angle estimate may then be updated to counter this computed angle. This process may then be iterated until the lane lines projected from successive image captures are substantially overlapping.

Continuing with this example, it may be understood that curved lane segments may not as readily converge to a state of substantial overlap. Accordingly, as with data detected during lane changes or during periods of relatively high lane position variance, the camera pitch and or yaw calibration may be improved by first filtering out lane detections associated with curved road segments. Alternatively, the iterative process of determining overlap may be configured to be tolerant of such data. Furthermore, the use of a median angle estimates as compared to a mean, may make yaw or pitch estimates less sensitive to contributions of such outlier data points. It will be appreciated that in some embodiments of the present disclosure, there may be a higher likelihood of storing data points corresponding to objects that are detected while the vehicle is driving along a curved road segment. In contrast, there may be a lower likelihood of using data points relating to lane line detections that are recorded along a curved road segment. Accordingly, data points collected while the vehicle travels along curved road segments may be treated differently in different variations of novel calibration procedures disclosed herein.

In each case illustrated in FIG. 11A and FIG. 11B, a single dimensional refinement of calibration parameters is provided which is expected to achieve a resulting mapping output that is more aligned with these general expectations, on average.

As can be seen in the examples, small errors associated with calibration of camera extrinsic parameters may lead to mapping errors that may increase with distance from a camera location. These errors may cause problems for vehicular mapping and/or localization. Accordingly, mapping systems may attempt to limit the effects of camera mis-calibration by limiting the mapping and/or use of perceived features in the environment to locations that are near to the vehicle.

In some embodiments, analysis of systematic mapping errors (which may be referred to individually as a pattern of mapping errors) of the kinds depicted in FIG. 11A and FIG. 11B may set a threshold for inclusion or exclusion of perceived objects and other environmental features. In other embodiments, analysis of such errors may be used to adjust and refine calibration parameters. In some applications, it may be desirable to use both techniques, to refine calibration parameters so that more of the perceived objects and environmental features may be incorporated per unit of time (e.g. per visual frame capture time), by setting a threshold according to an error tolerance.

Figure 12:
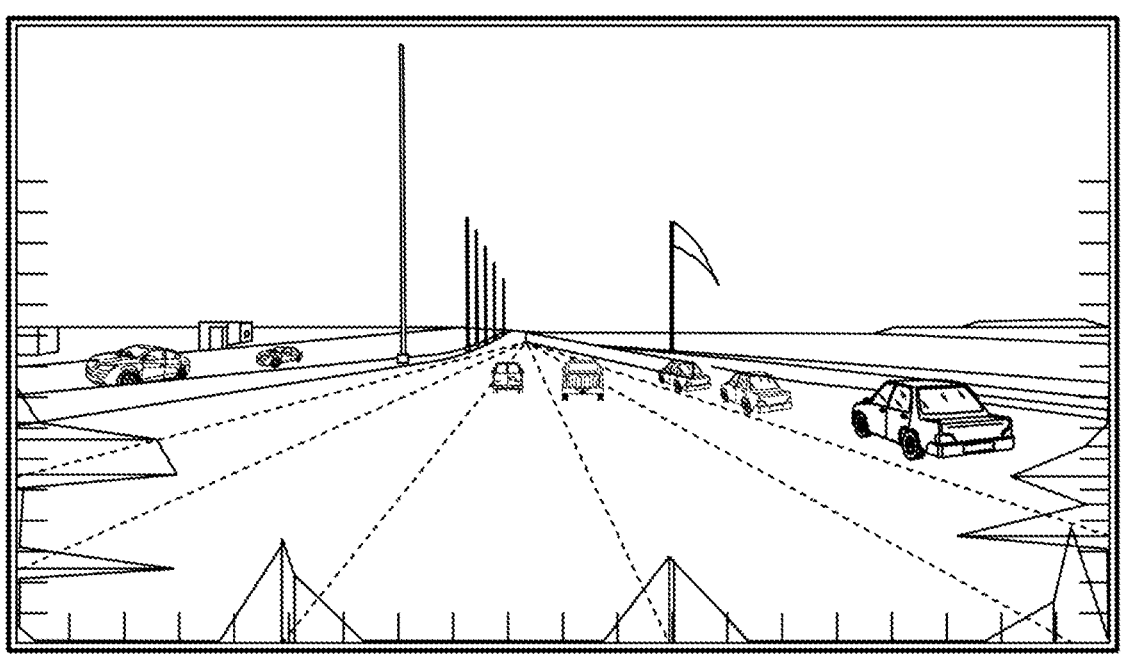
FIG. 12 illustrates an example of vehicular sensor system calibration in accordance with certain aspects of the present disclosure.

FIG. 12 illustrates an example in which real-time, or substantially real-time edge computing may automatically analyze a visual scene surrounding a vehicle. Detected lane lines, including road boundaries, are illustrated. The heights of jagged lines surrounding the bottom three-fourths of the image reflect a likelihood of the presence of a lane line at a corresponding bin.

Road boundaries may be substantially flat on a surface of a road. The lane boundaries may be detected with a camera sensor with or without a separate range estimate sensor. Accordingly, the detected lane boundaries illustrated in FIG. 12 may be mapped to a known road plane.

FIG. 11B illustrates mapping or local navigation frame projection errors that occur when the camera pitch is incorrectly configured. As can be seen, the lane lines may pitch inward or outward if the pitch setting is too low or too high, respectively. In the local navigation frame, lane lines that are known to be straight may appear to curve inward or splay outward. In practice, this curvature or splaying may be appreciated through a computation of the lane width at different points along the vehicle trajectory. Because lanes tend to maintain a constant width, systematic changes in the width of a lane (the distance between a left and right lane boundary) may be observed to get narrower or wider as more distant sections of the lane are mapped. The pitch estimate can then be adjusted until these lane line projections become parallel.

In some embodiments, the camera pitch and then the yaw may be calibrated sequentially. The pitch may be adjusted until projected lane lines from a single frame are parallel to each other and at a constant spacing on a ground plane. After accounting for the pitch, the yaw may be adjusted so that the lane lines overlap each other and point in the direction of the vehicle's average direction of travel. In this way, errors associated with camera pitch and camera yaw can be distinguished from each other. Furthermore, camera height may be adjusted in a separate step subsequent to the adjustments for camera yaw and pitch.

According to methods just described, vehicular sensor system calibration may be performed in the vehicle based on detected objects that are encountered during normal driving. A further benefit of this approach is that it may automatically account for distortions that are introduced during the process of installation in the vehicle. As one example, windshield curvature and properties may contribute optical distortion. Because the calibration steps just described are accomplished after the camera is already mounted to the windshield, the resulting calibration parameters naturally take into account these additional sources of distortion. In some embodiments, camera intrinsics (which may be referred to as intrinsic camera parameters) may be calibrated prior to mounting on a windshield. Certain techniques described herein may then adjust these calibration settings to further account for distortions introduced by the windshield itself after it is mounted. Likewise, use of certain techniques disclosed herein may facilitate the reuse of vehicular sensor systems in a different vehicle, after a collision in which the vehicle undergoes structural change, and the like.

In some embodiments, a misalignment between the center of focus of the lens and the center of the image sensor on which the lens projects may be determined with reference to detected lane lines and or road boundaries. A vanishing point may be a point at which parallel lane lines appear to intersect. A typical location of a vanishing point, which may be a center or mass or median position of calculated vanishing points across multiple frames, may serve as an initial estimate of a pitch and yaw of the camera. For example, if the image sensor is known to capture a 50 degree by 50 degree field of view, and the vanishing point is located at a point that is 5 percent of the image width (corresponding to 2.5 degrees) to the right of the center of the image, as well as 5 percent of the image height below the center of the image, then an initial estimate of the yaw may be 2.5 degrees to the left of straight-ahead, and the initial estimate of the pitch may be upwards 2.5 degrees. Using these values as initial estimates, multiple lane detections may be projected into a road plane. The angle of the projected lane detections at a distance one to two vehicle lengths in front of the camera may then be determined. If the angles of the ego left lane and the ego right lane deviate from each other, then the pitch estimate may be adjusted down or up depending on whether the angles point away from each other or towards each other. The lane lines may then be projected to the ground plane again using the new pitch estimate, and an adjustment may be iteratively made. After the angles of the projected lane lines are substantially parallel, then the yaw may be adjusted until the projected lane lines are also pointed in the direction of travel. After determining a pitch and yaw adjustment that results in parallel and straight ahead lane lines, the intrinsic camera parameters corresponding to an offset of the image sensor center may be determined as a difference between the initial estimate corresponding to the vanishing point computation and the pitch and yaw estimates determined according to the iterative technique just described.

Height Above the Road Calibration

According to certain aspects of the present disclosure, calibration of a camera height above the road may be achieved. By utilizing known characteristics about the typical width of the lane lines, the height of a vehicle-mounted camera may be determined based on the width of lanes in the image plane. In the United States, for example, highway lane lines are usually 12-feet wide. Certain aspects of the present disclosure are directed to estimating a height of a windshield-mounted camera above the road by using lane line detections. The camera height parameter may be referred to as 'h-cam' for height of camera.

Alternatively, or in addition, camera height may be calibrated based on road markings, such as ones illustrated in the top panel of FIG. 10, detected in the scene. By mapping a detected road marking to a position in the ground plane over successive detections, a height parameter may be adjusted until the road marking detections from separate detections substantially overlap. This same technique may be applied to other detectable road markings, such as horizontal lines at crosswalks, or the start and end of dashes in a dashed lane, that can be accurately localized along the vehicle's direction of travel.

Crowd-Sourced Mapping of Object and Traffic Boundary Locations

Figure 13:
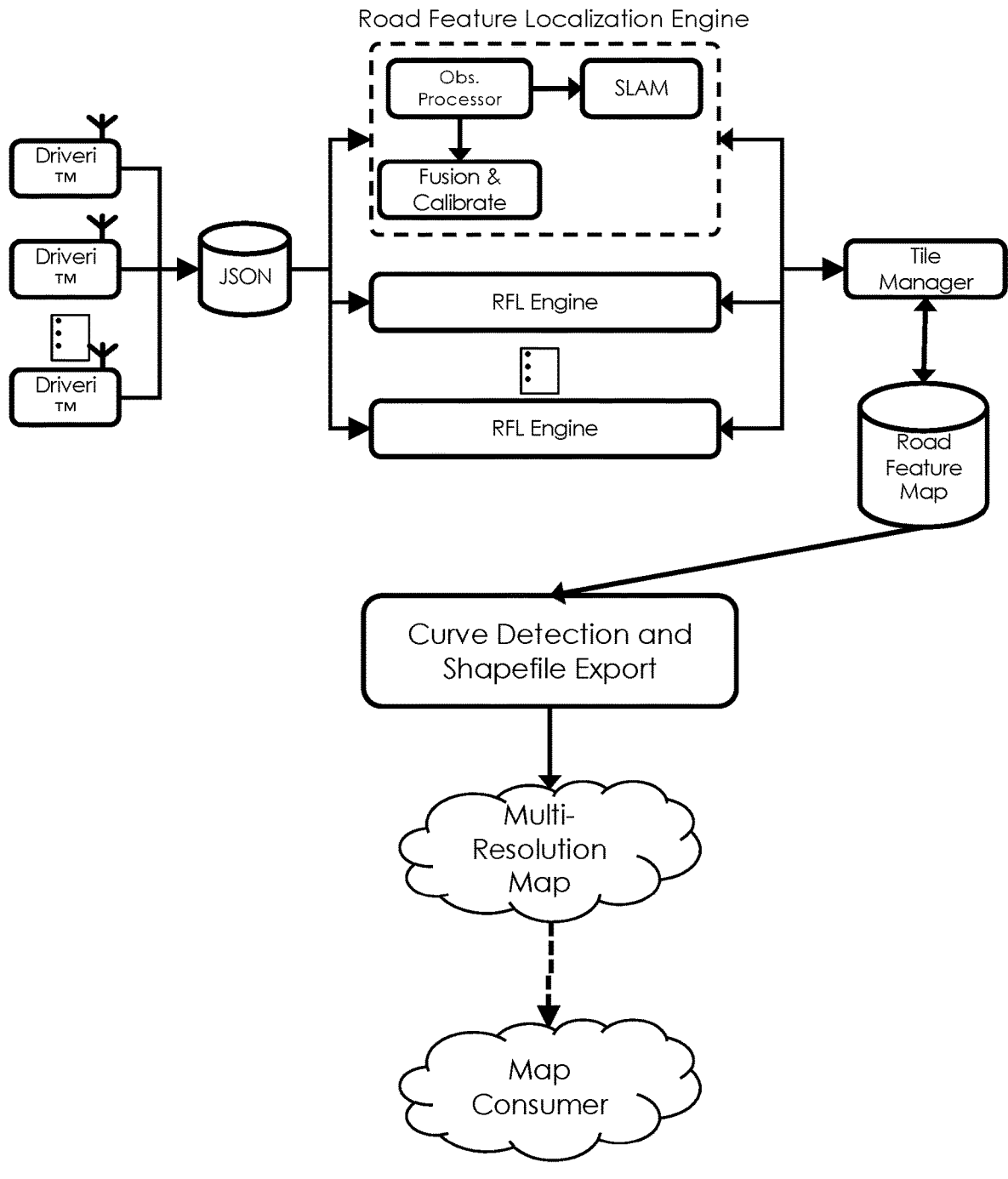
FIG. 13 illustrates an example of vehicular sensor system calibration in accordance with certain aspects of the present disclosure.

FIG. 13 illustrates a system of crowd-sourced mapping. Sensor data, after processing through deep learning on the device (which may be a Driveri device), is uploaded over a wireless link to the servers where they may be stored in a database based on files in a j son format (JSON). As the sensory recordings are uploaded, Road Feature Localization (RFL) Engines may run in parallel to further post-process the data (e.g. GNSS-INS sensor fusion and sensor calibration) and update lower-level map data tiles via the SLAM algorithm. A resulting map may be generated by further processing the map tiles to perform automated map generation, such as detecting lane lines from the occupancy grid and associating the road features with a topological map for routing and navigation. The resulting map is then stored by updating a database which can be accessed by other users or map consumers.

Figure 14:
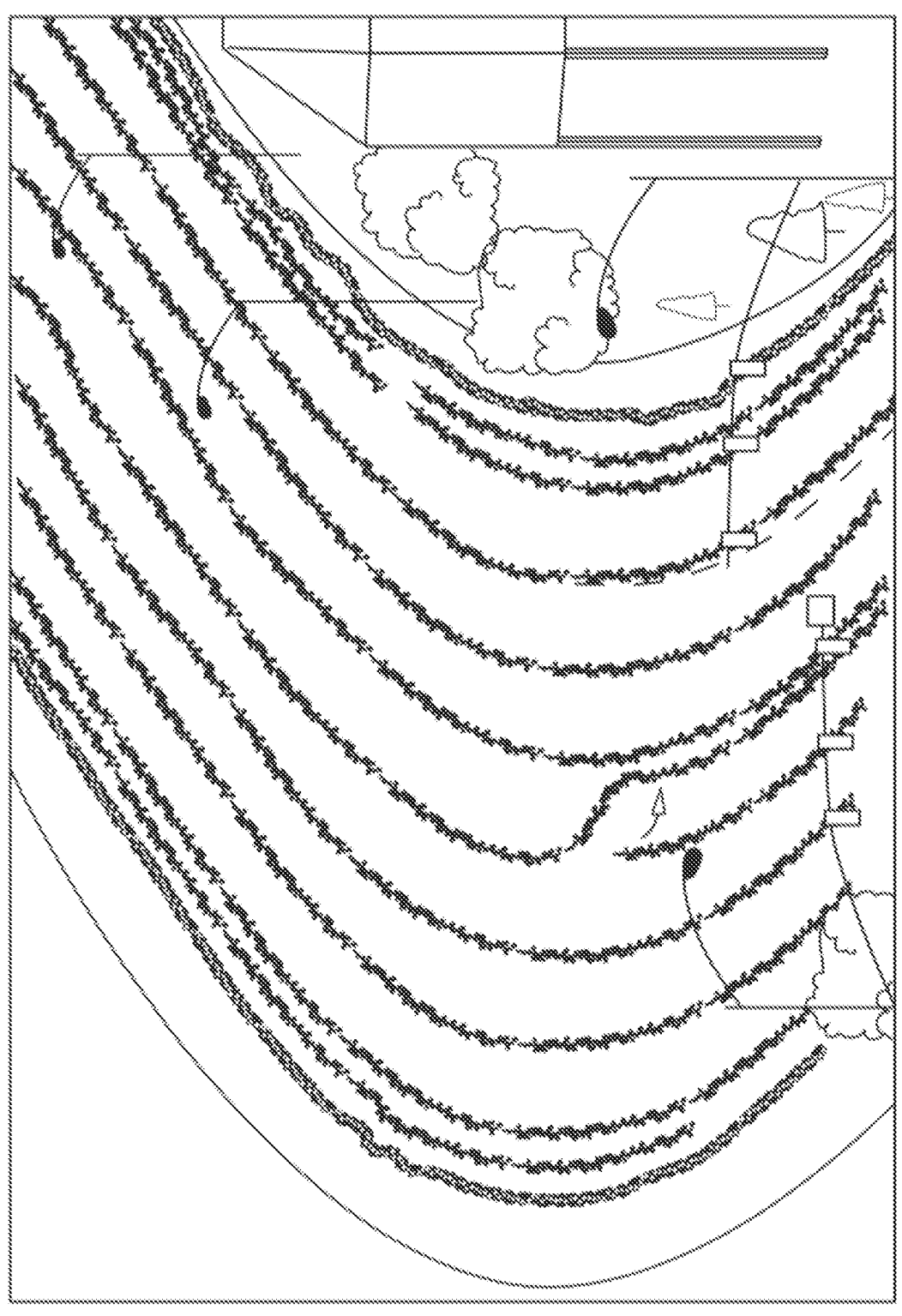
FIG. 14 illustrates an example of vehicular sensor system calibration in accordance with certain aspects of the present disclosure.

FIG. 14 illustrates one aspect of automated map generation from the lower-level occupancy grid map that includes road boundary and lane line path detection. Since an occupancy grid is a regularly spaced, discrete array (e.g. 10×10 cm) of cells, it does not directly capture the continuous and ordered nature of a path, as such features on a map are customarily represented. However, continuous and ordered paths may be constructed automatically from the occupancy grid to form, for instance, splines that can be associated with the road network. This may be done with an algorithm that selectively detects and draws paths that are consistent with the road features, through a process of automated map generation.

Figure 15:
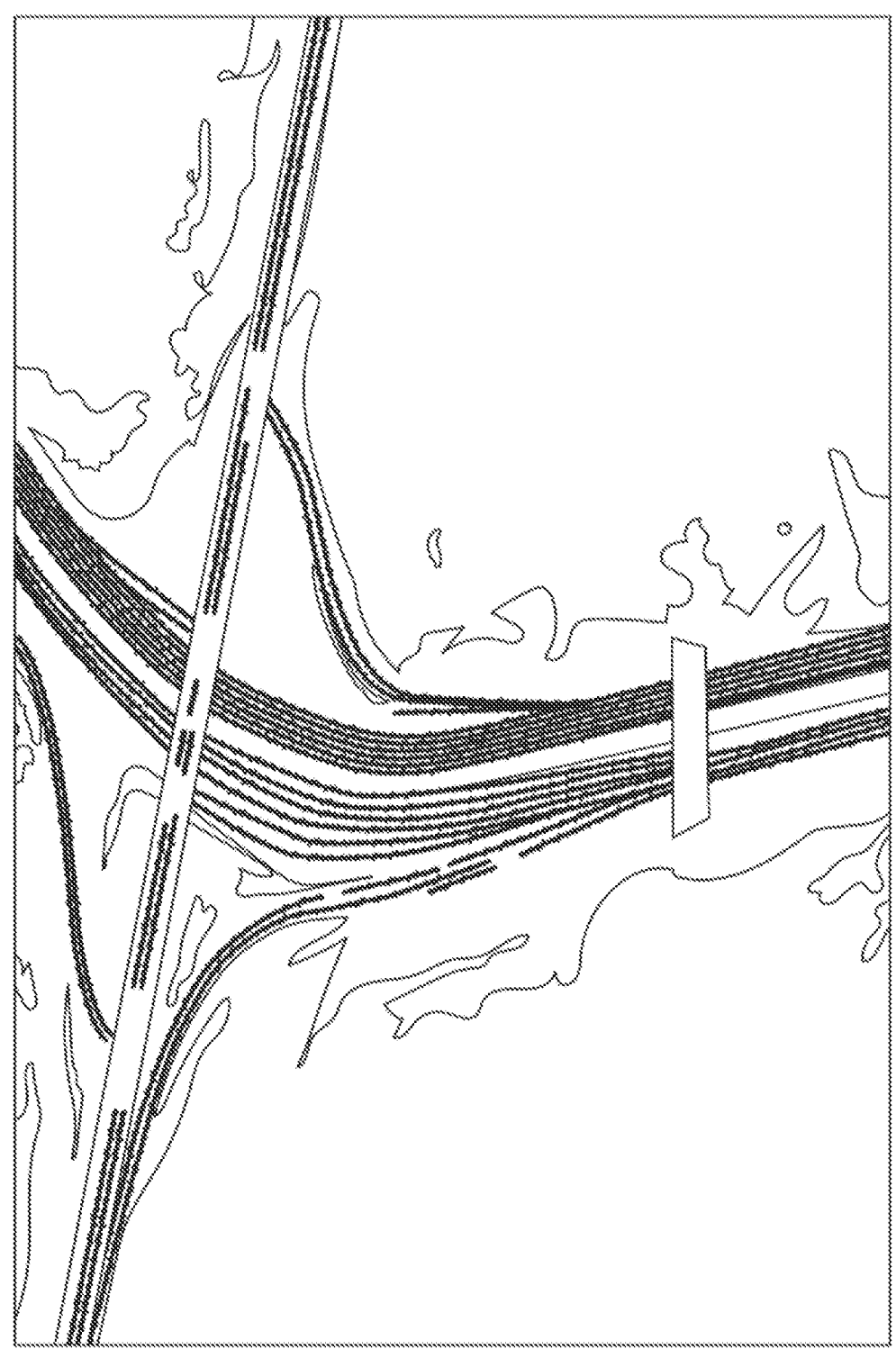
FIG. 15 illustrates an example of vehicular sensor system calibration in accordance with certain aspects of the present disclosure.

FIG. 15 illustrates a larger span of mapped traffic boundary locations that includes off-ramps and an overpass.

Some embodiments may use a particle filter to represent pose estimate of the vehicle. Every particle may build its own independent map of landmarks. At every step, each particle may be assigned a weight based on how well the measurements agree with the map. According to certain aspects of the present disclosure, the weight assigned to each mapped object or lane line may be based on knowledge about objects that are visible from vehicles.

Reprojection error may be determined as a difference between where the projection of a point object is expected to appear on the camera image plane and where that point object is actually detected. A bundle adjustment technique may then be applied to refine camera pose estimates and landmark locations in the map by jointly reducing total reprojection error.

In one example, weights associated with the location estimates of different objects in a map may be based on the shape of vehicle trajectories while the object was detected. As described above, objects that were passed with a curved trajectory may be more informative. In this example, the estimates of location while turning or otherwise sweeping across a large angle may be weighted higher. Conversely, in the context of a particle filtering or similar approach to map lane lines, the lane segments that are detected while the driver is on a straight road may be more highly weighted.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more specialized processors for implementing the neural networks, for example, as well as for other processing systems described herein.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method, comprising:
   receiving, at a device within a vehicle, visual data captured by a camera that is affixed to the vehicle;
   detecting, by the device and based on the visual data, a plurality of instances of a same object and a position of the object in the field of view of the camera for an environment outside of the vehicle;
   for each instance of the plurality of instances, determining a ray angle from a vehicle position to the object;
   identifying, using a distribution of a plurality of ray angles, a central ray angle and a deviation from the central ray angle;
   determining an object class to which the detected object belongs and represents a recognition of a type of the detected object;
   generating a plurality of calibration data points corresponding to the ray angle based on the position of the object in the field of view to the vehicle position, wherein a ray angle exhibiting greater deviation from the central ray angle contributes more to calibration of a vehicle sensor system than a ray angle closer to the central ray angle; and
   determining at least one calibration parameter of the vehicular sensor system based at least in part on a plurality of calibration data points in a calibration database, wherein the calibration database is configured to adjust the at least one calibration parameter for a sensor of the vehicle sensor system.

2. The method of claim 1, further comprising determining whether to store the calibration data points based on a determination that an object class to which the detected object belongs is one of a predetermined set of object classes having an attribute within the environment.

3. The method of claim 2, wherein the predetermined set of object classes comprises object classes that tend to be stationary and on or near a road.

4. The method of claim 2, wherein the predetermined set of object classes comprises traffic lights, traffic signs, and road markings.

5. The method of claim 1, further comprising:
   receiving, at the device, the vehicle position from a positional sensor affixed to the vehicle, wherein the vehicular sensor system comprises the camera and the positional sensor;
   determining a plurality of vehicle locations, wherein each vehicle location of the plurality of vehicle locations corresponds to a location of the vehicle at a time of a plurality of times when a visual data frame was captured by the camera; and
   determining a plurality of object detections, wherein each object detection comprises a position of the object in the field of view of the camera at a time of the plurality of times.

6. The method of claim 5, wherein determining whether to store the data point is further based on a property of the plurality of object detections.

7. The method of claim 6,
   wherein the property of the plurality of object detections is a property of the plurality of ray angles.

8. The method of claim 7, wherein the property of the plurality of ray angles is a range of ray angles to the object, and wherein a calibration data point corresponding to the position of the object is stored in response to a determination that the range of ray angles is above a threshold.

9. The method of claim 7,
   wherein the property of the plurality of ray angles is the central ray angle.

10. The method of claim 9, wherein a calibration data point corresponding to the position of the object is stored in response to a determination that the corresponding ray angle deviates from the central ray angle.

11. The method of claim 10, further comprising:
    determining a plurality of deviation values, wherein each deviation value corresponds to a difference between a ray angle of the plurality of ray angles and the central ray angle.

12. The method of claim 11,
    wherein each ray angle of the plurality of ray angles is stored along with a weighting parameter, wherein the weighting parameter is based on a corresponding deviation value, and wherein the weighting parameter is increased for ray angles of the plurality of ray angles that have an increased corresponding deviation value.

13. The method of claim 11, further comprising:
    selecting a subset of ray angles from the plurality of ray angles; wherein a probability of selecting a ray angle is increased for ray angles that have an increased corresponding deviation value; and wherein a data point corresponding to the position of the object is stored in response to a determination that the ray angle belongs to the selected subset.

14. The method of claim 6, further comprising:
    determining a vanishing point;
    determining a distance from each object detection of the plurality of object detections to the vanishing point;

storing a data point corresponding to a position of each object detection in the calibration database, wherein each data point is stored along with a weighting parameter, and wherein the weighting parameter is increased for object detections that are more distant from the vanishing point.

15. The method of claim 6, further comprising:

determining a plurality of aspect ratios, each aspect ratio based on a bounding box associated with an object detection of the plurality of object detections; and determining a variance in the plurality of aspect ratios; wherein the property of the plurality of object detections is the variance in the plurality of aspect ratios, and wherein a data point corresponding to the position of the object is stored in response to a determination that the variance is below a threshold.

16. The method of claim 6, wherein the property of the plurality of object detections is a hit rate of object detections, wherein the hit rate is a ratio of a number of object detections to a number of times in the plurality of times when a visual data frame was captured by the camera, and wherein the calibration data point is stored in response to a determination that the hit rate is above a threshold.

17. The method of claim 5, wherein determining whether to store the calibration data point is further based on a property of the plurality of vehicle locations.

18. The method of claim 17:

wherein the property of the plurality of vehicle locations corresponds to a distance travelled by the vehicle, and wherein the calibration data point corresponding to the position of the object is stored in response to a determination that the distance travelled is above a threshold.

19. The method of claim 17:

wherein the property of the plurality of vehicle locations corresponds to a curvature of a trajectory of the vehicle, and wherein the calibration data point corresponding to the position of the object is stored in response to a determination that the curvature is above a threshold.

20. The method of claim 1, further comprising:

filtering the calibration database; and wherein the plurality of stored calibration data points on which the determination of the at least one calibration parameter of the vehicular sensor system is based is a plurality of data points in the filtered calibration database.

21. The method of claim 20, further comprising:

determining a plurality of uncertainty values; wherein each uncertainty value corresponds to an extent of locations in an extra-vehicular reference frame that are consistent with a plurality of ray angles and vehicular positions that are stored in the calibration database and that correspond to a detected object; and wherein filtering the calibration database comprises ignoring calibration data points associated with uncertainty values that are atypically large with respect to the plurality of uncertainty values.

22. The method of claim 1, further comprising:

determining one or more keypoints within the detected object; and wherein the calibration data point corresponds to a keypoint of the one or more determined keypoints.

23. The method of claim 1, wherein a calibration parameter of the at least one calibration parameters is an offset between the camera and a positioning sensor, wherein the positioning sensor is affixed to the vehicle.

24. The method of claim 1, wherein the at least one calibration parameter is at least one of:

a distance and a direction between a camera and a positional sensor;

a height of the positional sensor when the vehicle is at rest;

a height of the camera when the vehicle is at rest;

a pitch of the camera when the vehicle is at rest;

a roll of the camera when the vehicle is at rest;

a yaw of the camera when the vehicle is at rest; or an intrinsic parameter of camera.

25. A computer program product, the computer program product comprising:

a non-transitory computer-readable medium having program code recorded thereon, the program code, when executed by one or more processors, causes the one or more processors to:

detect, by the first processor and based on the visual data, a plurality of instances of a same object and a position of the object in the field of view of the camera for an environment outside of the vehicle;

for each instance of the plurality of instances, determining a ray angle from a vehicle position to the object;

identifying, using a distribution of a plurality of ray angles, a central ray angle and a deviation from the central ray angle;

determining an object class to which the detected object belongs and represents a recognition of a type of the detected object;

generating a plurality of calibration data points corresponding to the ray angle based on the position of the object in the field of view to the vehicle position, wherein a ray angle exhibiting greater deviation from the central ray angle contributes more to calibration of a vehicle sensor system than a ray angle closer to the central ray angle; and determine at least one calibration parameter of the vehicular sensor system based at least in part on a plurality of calibration data points in a calibration database, wherein the calibration database is configured to adjust the at least one calibration parameter for a sensor of the vehicle sensor system.

26. The computer program product of claim 25, wherein the object is an object belonging to a class of objects that tends to be stationary and situated on or near a road.

* * * * *